(12) United States Patent
Sanz Pascual et al.

(10) Patent No.: US 10,119,522 B2
(45) Date of Patent: Nov. 6, 2018

(54) SYSTEM AND METHOD OF ASSEMBLING A WIND TURBINE

(71) Applicant: NABRAWIND TECHNOLOGIES SL, Pamplona (ES)

(72) Inventors: Eneko Sanz Pascual, Pamplona (ES); Hely Ricardo Savii Costa, Uterga (ES)

(73) Assignee: NABRAWIND TECHNOLOGIES SL, Pamplona (ES)

( * ) Notice: Subject to any disclaimer, the term of this patent is extended or adjusted under 35 U.S.C. 154(b) by 0 days.

(21) Appl. No.: 15/283,810

(22) Filed: Oct. 3, 2016

(65) Prior Publication Data

US 2017/0114777 A1  Apr. 27, 2017

Related U.S. Application Data

(63) Continuation-in-part of application No. PCT/ES2014/000056, filed on Apr. 1, 2014.

(51) Int. Cl.
*F03D 13/10* (2016.01)
*E04H 12/34* (2006.01)
(Continued)

(52) U.S. Cl.
CPC ............ *F03D 13/10* (2016.05); *E02B 17/027* (2013.01); *E02B 17/08* (2013.01); *E04H 12/10* (2013.01); *E04H 12/342* (2013.01); *E04H 12/344* (2013.01); *F03D 13/20* (2016.05); *F03D 13/25* (2016.05); *E02B 2017/0039* (2013.01); *E02B 2017/0047* (2013.01); *E02B 2017/0065* (2013.01); *E02B 2017/0091* (2013.01); *F05B 2230/61* (2013.01); *F05B 2240/9121* (2013.01);
(Continued)

(58) Field of Classification Search
CPC ....... F03D 13/10; F03D 13/25; E04H 12/344; E04H 12/342; F05B 2230/61
See application file for complete search history.

(56) References Cited

U.S. PATENT DOCUMENTS 6,425,712 B1 * 7/2002 Vanderklaauw ........ B66F 1/025
248/354.1
8,578,679 B1 * 11/2013 Petricio Yaksic ....... E04H 12/28
52/745.17
(Continued)

FOREIGN PATENT DOCUMENTS

DE  4301467 A1  7/1994
DE  10111280 A1  7/2002
(Continued)

OTHER PUBLICATIONS

International Search Report, PCT/ES2014/000056, dated Sep. 23, 2009, 3 pages.
(Continued)

*Primary Examiner* — Babajide A Demuren
(74) *Attorney, Agent, or Firm* — Edell, Shapiro & Finnan, LLC

(57) ABSTRACT

Systems for assembling a wind turbine without the assistance of cranes. According to some implementations a system is provided that includes lifting systems having lifting platforms arranged peripherally around the tower. The lifting platforms cooperate with different connection tools that can be supported on an auxiliary column and thus lift or lower the tower modules.

14 Claims, 42 Drawing Sheets

(51) Int. Cl.
  *E04H 12/10* (2006.01)
  *F03D 13/20* (2016.01)
  *F03D 13/25* (2016.01)
  *E02B 17/02* (2006.01)
  *E02B 17/08* (2006.01)
  *E02B 17/00* (2006.01)

(52) U.S. Cl.
  CPC .......... *Y02E 10/726* (2013.01); *Y02E 10/728* (2013.01); *Y02P 70/523* (2015.11)

(56) References Cited

U.S. PATENT DOCUMENTS

| | | | |
|---|---|---|---|
| 2004/0226258 A1* | 11/2004 | Zingerman | E04C 3/005 52/749.11 |
| 2009/0087311 A1 | 4/2009 | Wyborn | |
| 2010/0044330 A1* | 2/2010 | Vorhies | B66C 17/06 212/175 |
| 2015/0292263 A1* | 10/2015 | Hierl | E04G 5/007 182/128 |
| 2015/0361685 A1* | 12/2015 | Abreu | E04H 12/10 52/40 |
| 2016/0130832 A1* | 5/2016 | Zavitz | F03D 13/10 52/40 |
| 2017/0241407 A1* | 8/2017 | Joss | F03D 13/20 |

FOREIGN PATENT DOCUMENTS

| | | | |
|---|---|---|---|
| EP | 0607915 B1 | 7/1994 | |
| EP | 2644557 A1 * | 10/2013 | ........... B66C 23/207 |
| EP | 2712985 A1 * | 4/2014 | ........... E04H 12/344 |
| ES | 2389345 A1 | 10/2012 | |
| JP | 2001254668 A * | 9/2001 | ............ F03D 13/10 |
| JP | 2005042313 A | 2/2005 | |
| WO | 2011055021 A2 | 5/2011 | |
| WO | 2011127935 A1 | 10/2011 | |
| WO | 2011135172 A1 | 11/2011 | |

OTHER PUBLICATIONS

Partial Supplementary European Search Report in corresponding EP Application No. 14888332.5, dated Oct. 23, 2017.

\* cited by examiner

SYSTEM AND METHOD OF ASSEMBLING A WIND TURBINE

CROSS-REFERENCE TO RELATED APPLICATIONS

This application relates to and claims the benefit and priority to International Application No. PCT/ES2014/000056, filed Apr. 1, 2014.

TECHNICAL FIELD

This disclosure relates to the assembly of wind turbines and, particularly, to the assembly of a nacelle and its corresponding tower.

BACKGROUND

The assembly and transport of modern wind turbines condition the design because of their increase in size. While wind turbines continue growing in size and power generation capacity, their assembly has nevertheless become more complicated because of the need for even taller cranes, which are scarce on the market and costly to rent.

The current state of the art includes solutions for avoiding the use of cranes during wind turbine assembly. Most of these solutions involve assembly as mounting sections on top of the others, though the following examples involve mounting modules from below.

U.S. Publication No. 2009/0087311 presents a complex system for lifting a tower and subsequently its nacelle with a full rotor. Wind turbines erected in this manner usually stand at a height of between 40 and 90 meters, and are thus dwarfed by the 160 meter tower proposed herein. Additionally, the tower sections are covered by guide rails for engaging the structure actuators that lift the assembly. The lifting system is operated from the same nacelle, which is in turn secured by braces to support the moments that it undergoes.

Spanish Publication No. 2389345 discloses some clamps with radial movement to restrain the tower while incorporating the next sections. It also includes some vertical cylinders with perpendicular actuators for hold the wind turbine while it is being mounted. This solution falls short however in that the cylinders do not operate when the clamps engage and vice versa. While logically the wind turbine is not running while it is being erected, there are nevertheless loads derived from its own weight and the incidence of the air flow on the wind turbine. Such stresses create a bending moment, and the reactions should be, after all, vertical loads. Such vertical reactions should be sustained by the conceived system throughout the entire process. In Spanish Publication No. 2389345, when only the clamps engage, the sole vertical load would be the traction of the clamps against the tower. In order for this traction to suffice to balance the mentioned moment, the radial force would have to be so strong that it would create a dent in the tower. This is thus considered to be an insufficient solution to the problem that the present proposal solves.

The state of the art differs from the present disclosure mainly in that the design is specifically created to withstand the loads sustained by the lifting system during the assembly process, thus providing continuity in the load trajectory and a low load in the lower zone of the system. There is no need for redundant systems of clamps or cylinders (as contemplated in Spanish Publication No. 2389345), or reinforcement braces and rails for guiding the sections (as contemplated in U.S. Publication No. 2009/0087311).

SUMMARY OF THE DISCLOSURE

The most important device used in the present invention is the lifting system, which has the same dimensions as the current modules in which wind turbines are fragmented because of their transport limits. The current modules into which a tower is fragmented or any other wind turbine component have a maximum height of 12 meters, which converts to a length of 12 meters during shipment. This length is the limit of most standard carriers worldwide. Additionally, the assembly method and the devices employed therein are valid for towers of any sort. According to some embodiments assembly is done on a latticed tower having a constant cross-section along the full span of its length instead of truncated-cone sections as currently used in solid towers.

A method for lifting a complete nacelle with the joint ring between the tower and nacelle is also provided. The ring includes the yaw system, wind turbine drive train support bench and the electrical systems necessary to run the wind turbine. These elements are modular and can be mounted gradually on the tower foundation or a basic tower module for providing the assembly with sufficient height so that handling joint elements can be done easily. The nacelle will be mounted before or after the lifting systems are positioned in place. After mounting the nacelle (which may be without the rotor and/or blades), the nacelle is then be lifted and the tower modules will be mounted underneath it.

According to some embodiments three lifting systems are arranged in a triangular shape peripherally to the tower foundation. According to some embodiments each tower module has a height of 12 meters and the lifting platforms associated with the lifting systems can be lifted and lowered at least the 12 meters of each tower module. These lifting systems are equipped with a base having enough surface to provide a stable seating on the terrain surrounding the tower foundation. Depending on the characteristics of the terrain, some sort of anchor can be added without varying the overall concept of the lifting system and assembly process. The connection of the lifting system and basic module or lower tower section, anchored to the foundation, is also contemplated.

Should the latticed tower have additional legs (four, five, etc.), it is beneficial that there be as many lifting systems as legs on the tower so that loads are transmitted as naturally as possible according to the tower design.

The use and design of a specific tool employed together with the lifting platform is also contemplated, to which, for instance, an auxiliary column and its corresponding connection parts are added for securing the various tower modules that will be sequentially erected.

The assembly system is capable of mounting a complete wind turbine (with the possible exception of its rotor and blades) with no need for an exceptionally tall boom crane (e.g. taller than 160 meters) to span the height of the tower plus the height corresponding to the nacelle.

The use of both the lifting system as well as the process for erecting offshore wind turbines is also disclosed. According to one embodiment the underwater part of the tower is generally the same as the other parts, thus precluding extremely heavy and expensive transitions normally made between the underwater anchor and wind turbine tower. The underwater section is put into place before the rest. First, pre-assembly is done on a floating platform. Subsequently, after opening an orifice on the platform having a diameter greater than the diameter of the tower, the same lifting platform can be used to submerge the underwater section to the seabed. After securing the underwater section, the assembly process as described above may then be followed to erect the entire wind turbine on that underwater section as if it were a foundation on the ground.

BRIEF DESCRIPTION OF THE DRAWINGS

Below is a brief description of a series of drawings useful for better understanding the various embodiments of the apparatus and methods disclosed herein.

DETAILED DESCRIPTION

Figure 1:
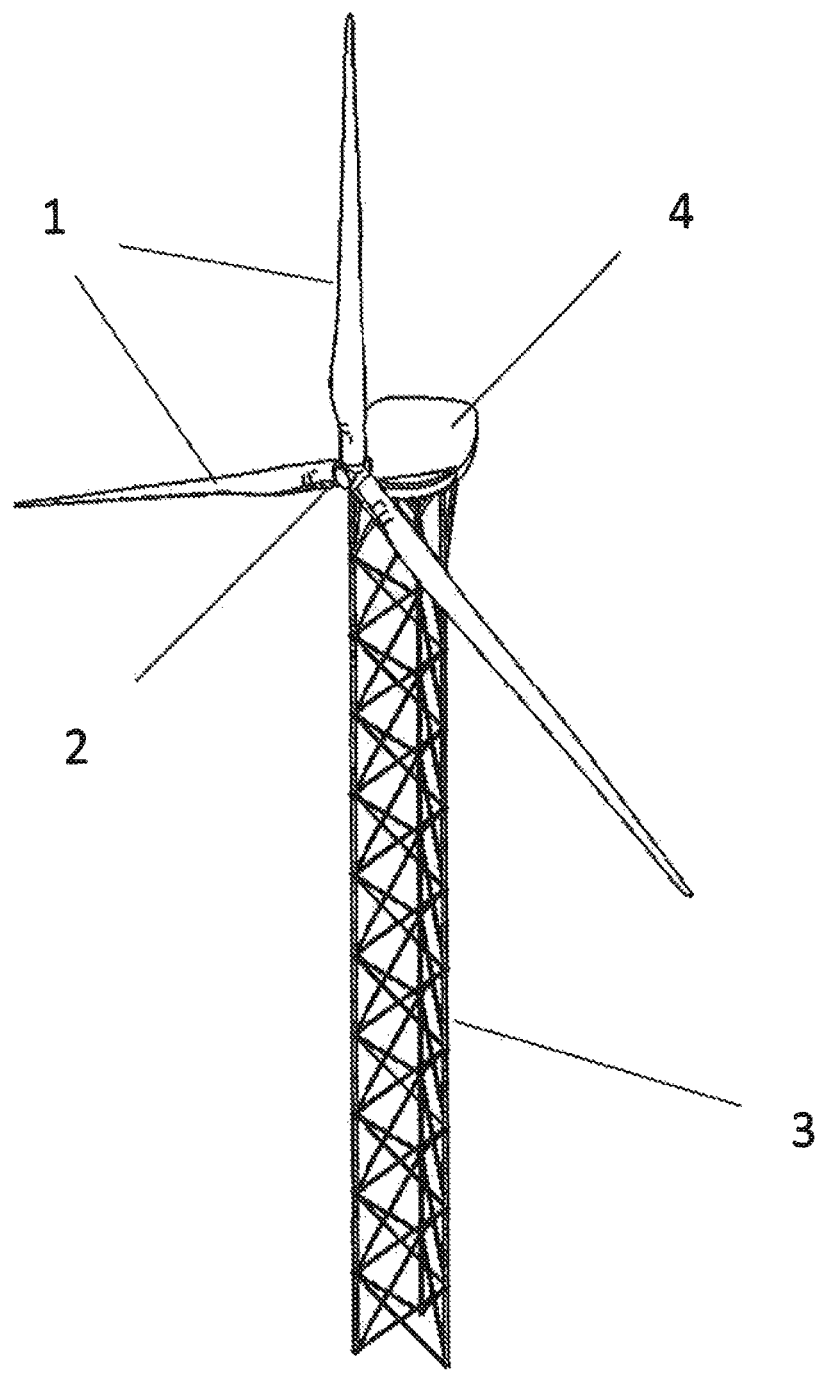
FIG. 1 shows a wind turbine.

FIG. 1 depicts a wind turbine that may be assembled by the devices and methods disclosed herein. The wind turbine comprises blades 1 connected to a rotor 2, and a nacelle 4 mounted on a tower 3. The tower 3 may be a latticed tower of three legs equally-spaced along its full height. The wind turbine includes a multi-megawatt generator and consequently has a substantially height (e.g. 160 meters or greater) that would typically require the use of very tall and expensive cranes in the assembly process of the wind turbine.

Figure 2A:
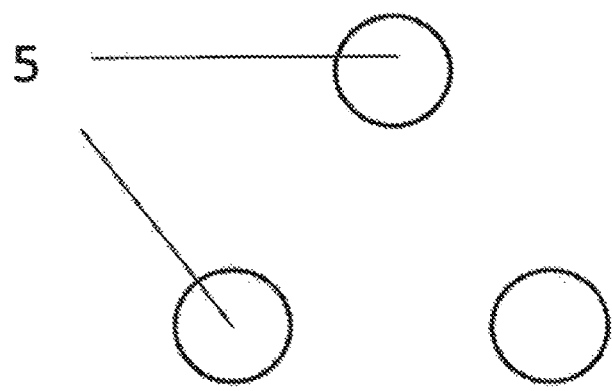
FIGS. 2A and 2B respectively depict plan and front views of a foundation.
Figure 2B:
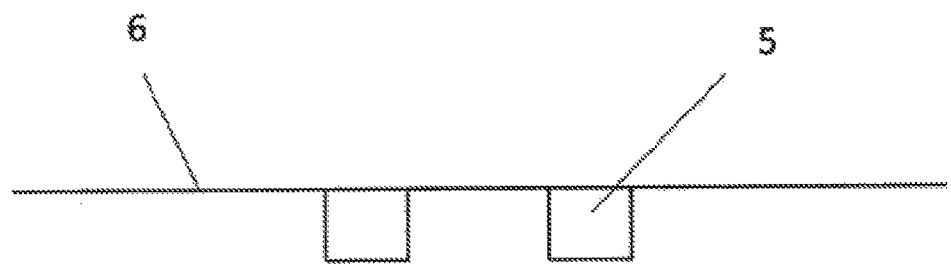
Figure 3A:
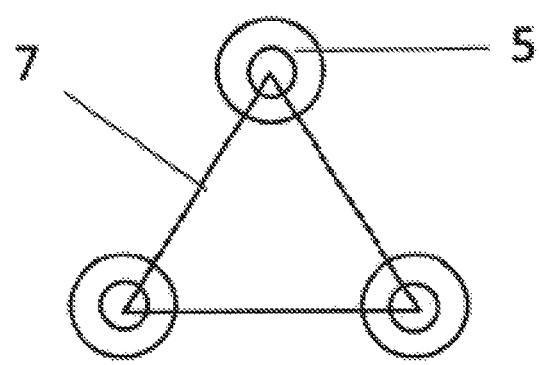
FIGS. 3A and 3B respectively depict plan and front views of a foundation and a lower tower module.
Figure 3B:
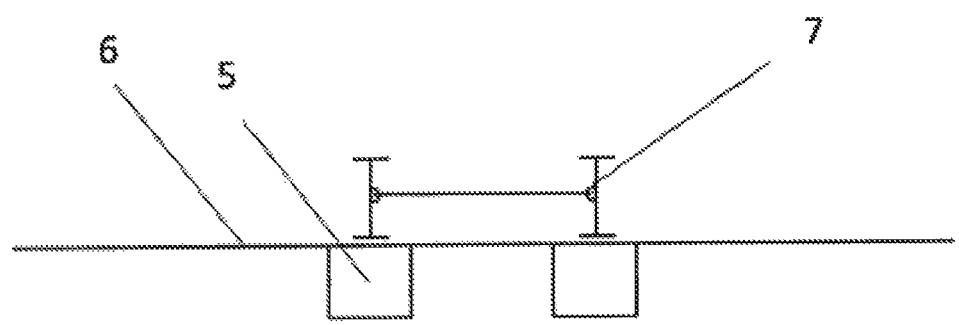

The assembly of the wind turbine tower can be done without the use of cranes through a series of steps and using a series of devices. According to one embodiment the first step entails preparing the tower foundation 5 as illustrated, for example, in FIGS. 2A and 2B. This foundation 5 is established underground 6 and its dimensions should be in proportion to the loads and stresses to withstand. A following step entails installing a basic tower module 7 as illustrated, for example, in FIGS. 3A and 3B. The basic tower module 7 is an auxiliary element used to provide height and maneuverability between the ground 6 and the elements that will subsequently be mounted, such as a nacelle 4 and various tower sections 3. The design of the basic tower module 7 may generally be the same as the tower modules though smaller in height. On completion of the assembly process, the basic tower module 7 can remain mounted with the remaining modules or be dismounted and/replaced with accessories such as an anchor system for offshore models.

Figure 4A:
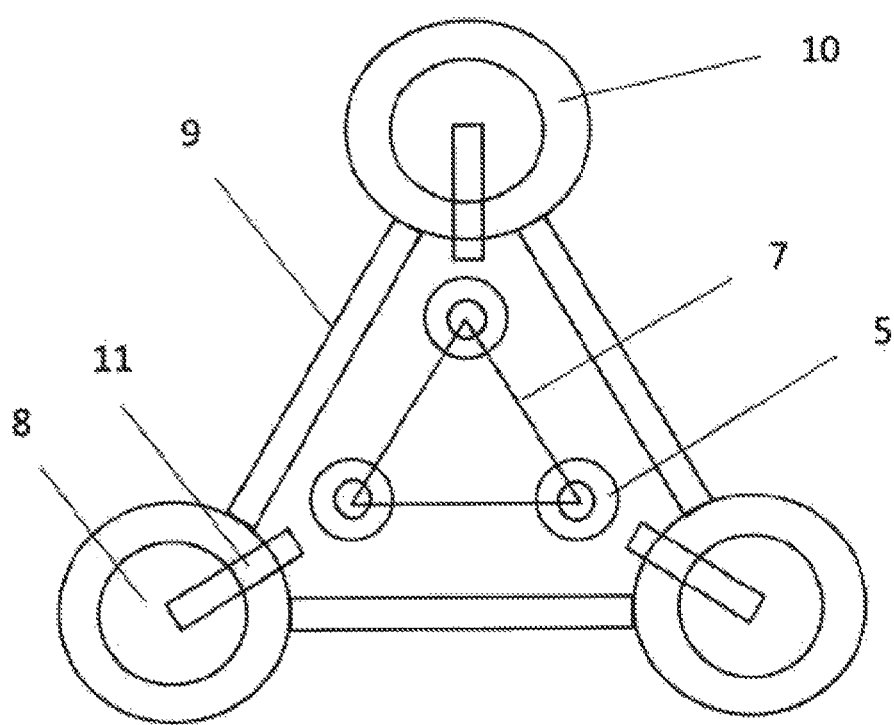
FIGS. 4A and 4B respectively depict plan and front views of a foundation, a lower tower module and a lifting system.
Figure 4B:
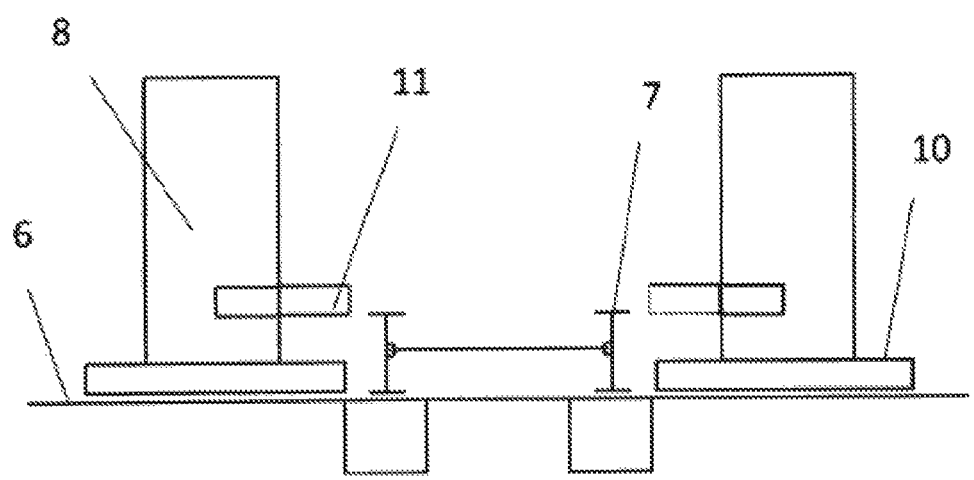

FIGS. 4A and 4B depict exemplary lifting systems 8 that are arranged in a triangle shape at the edges of the foundation 5 and have a joint structure 9 that extends between the three lifting systems 8. Each lifting system is supported by its corresponding base 10 and has a lifting platform 11 capable of moving vertically between a high point and a low point of the cited lifting system 8.

The bottom of the lifting system 8 has a lifting mechanism that may comprise electric motors, hydraulic cylinders, rack-pinion units, chains, etc. These elements may be used to lift and lower the lifting platform 11. Loads are absorbed by the lifting platforms 11 and transferred to the lifting systems 8 and their corresponding bases 10. The bases have a diameter or cross-sectional area sufficient to withstand the moments arising from eccentric loads produced between the wind turbine and the lifting systems 8. It should be borne in mind that the distance between the axis of the tower 3 and each axis of the lifting system 8 creates a secondary moment against the structure that should be considered.

Figure 5:
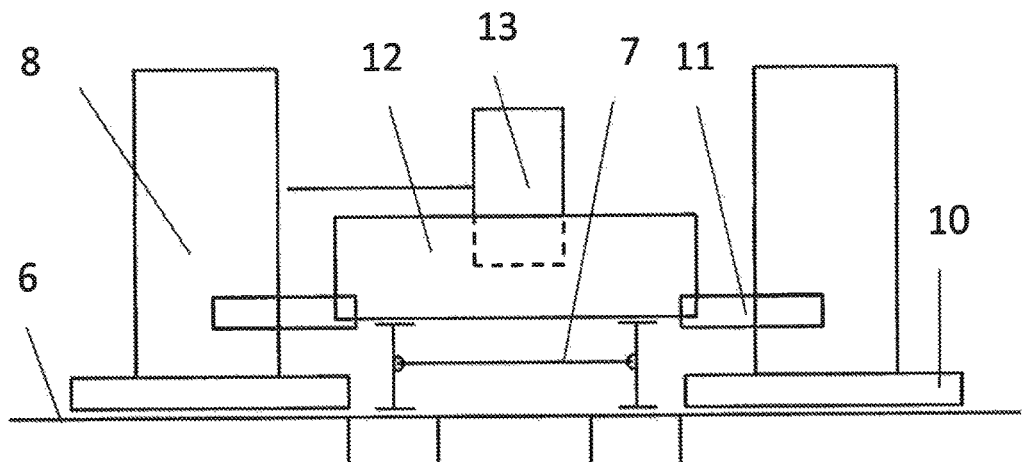
FIG. 5 illustrates a front view of the nacelle mounted on a lifting system.

The assembly commences at FIG. 5 with the constitution of the nacelle 4 and its constituent elements. First the joint ring 12 is mounted between the tower 3 and the drive train. The joint ring 12 is generally a ring-shaped part having a top that bears the yaw system and has a capacity to support the drive train and house part of the generator 13 inside. The nacelle 4 generally includes the drive train, bench, connection part and electrical systems. The nacelle 4 is mounted over the basic tower module 7 and supported on the corresponding lifting platforms 11.

Figure 6:
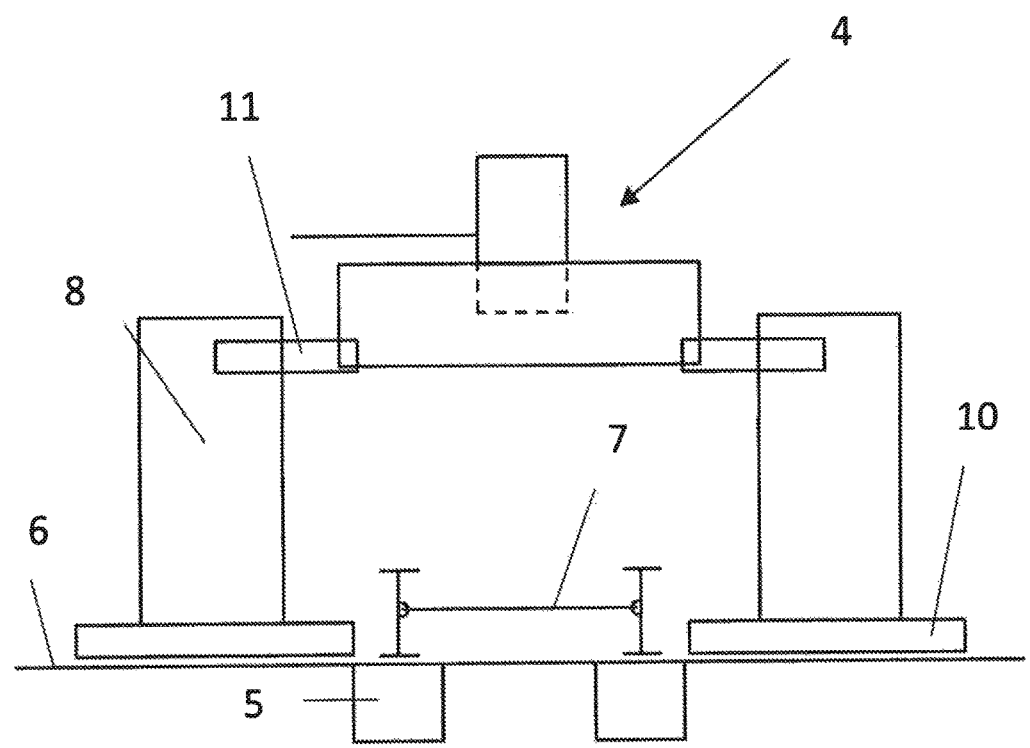
FIGS. 6, 7, 8, 9, 10, 11, 12, 13, 14 and 15 depict various stages in the assembly of a tower of a wind turbine according to one embodiment.

The lifting of the nacelle is illustrated in FIG. 6 and occurs when each lifting platform 11 moves from a lower to an upper point on the corresponding lifting system 8.

Figure 7:
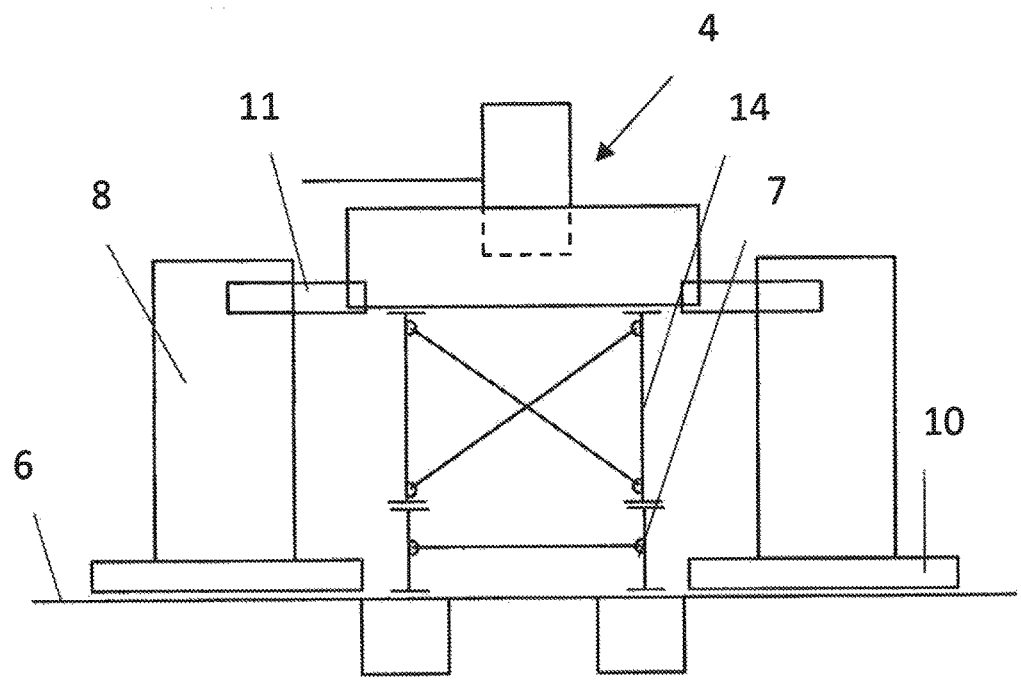
Figure 8:
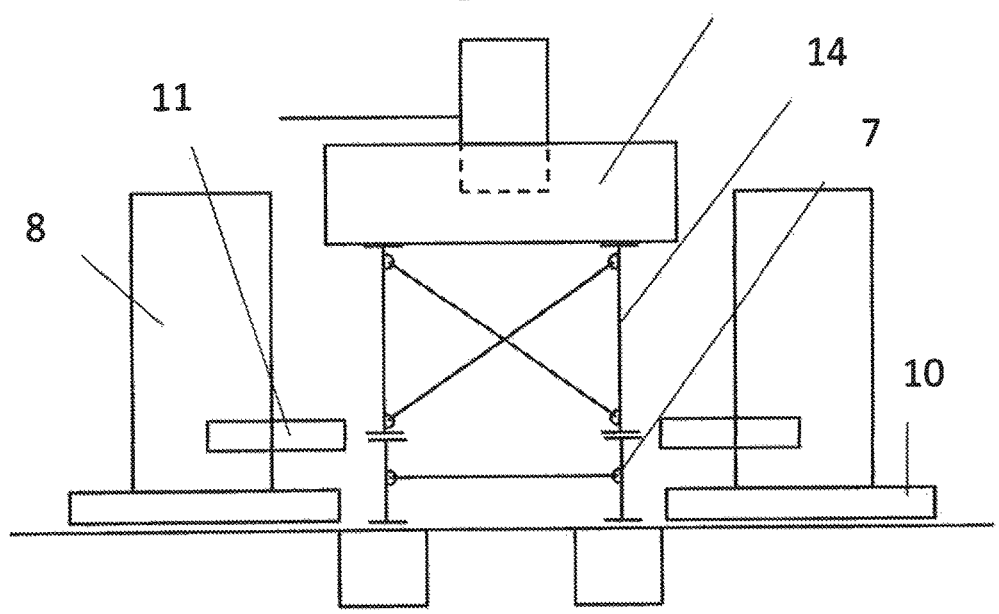

FIGS. 7 and 8 illustrate how an upper tower module 14 is mounted under the nacelle 4 and above the basic tower module 7, followed by the anchoring of the upper tower module (14) by bolting the legs of the upper tower module 14 with plates (not shown in the figure) on the joint ring 12 and on the basic tower module 7. When the foregoing is secured with corresponding fastening elements, the lifting platforms 11 are then lowered 11.

Figure 9:
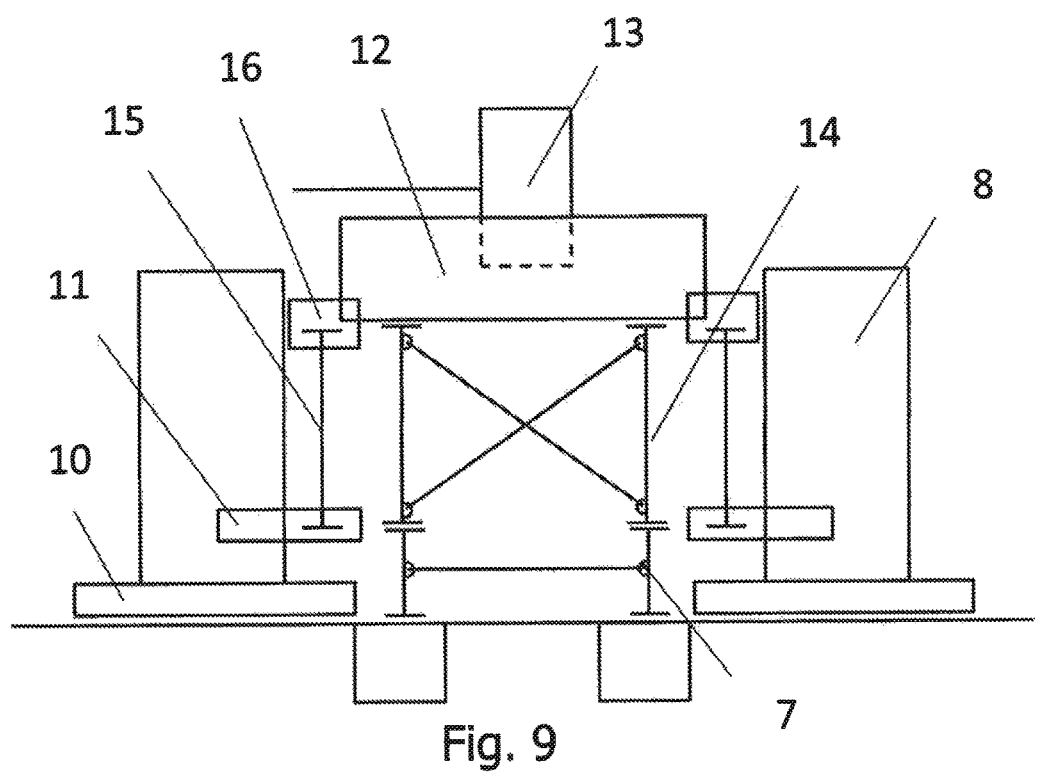
Figure 10:
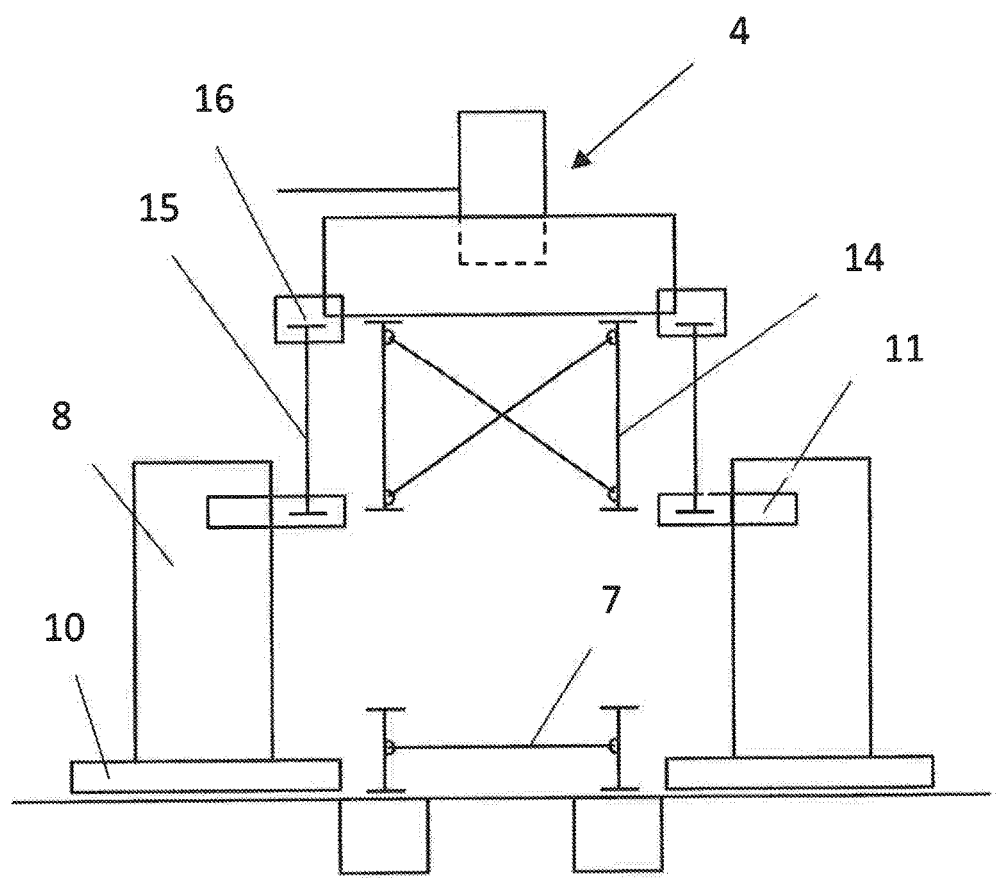
Figure 11:
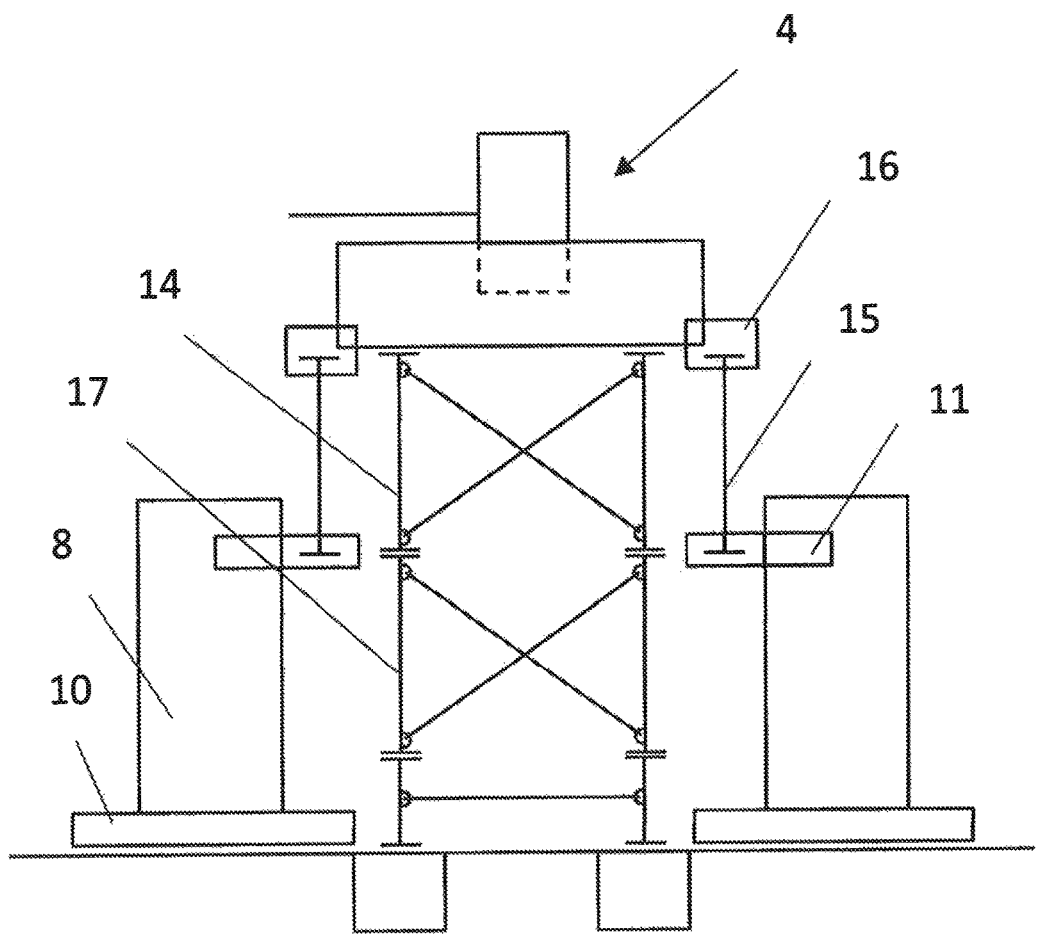
Figure 12:
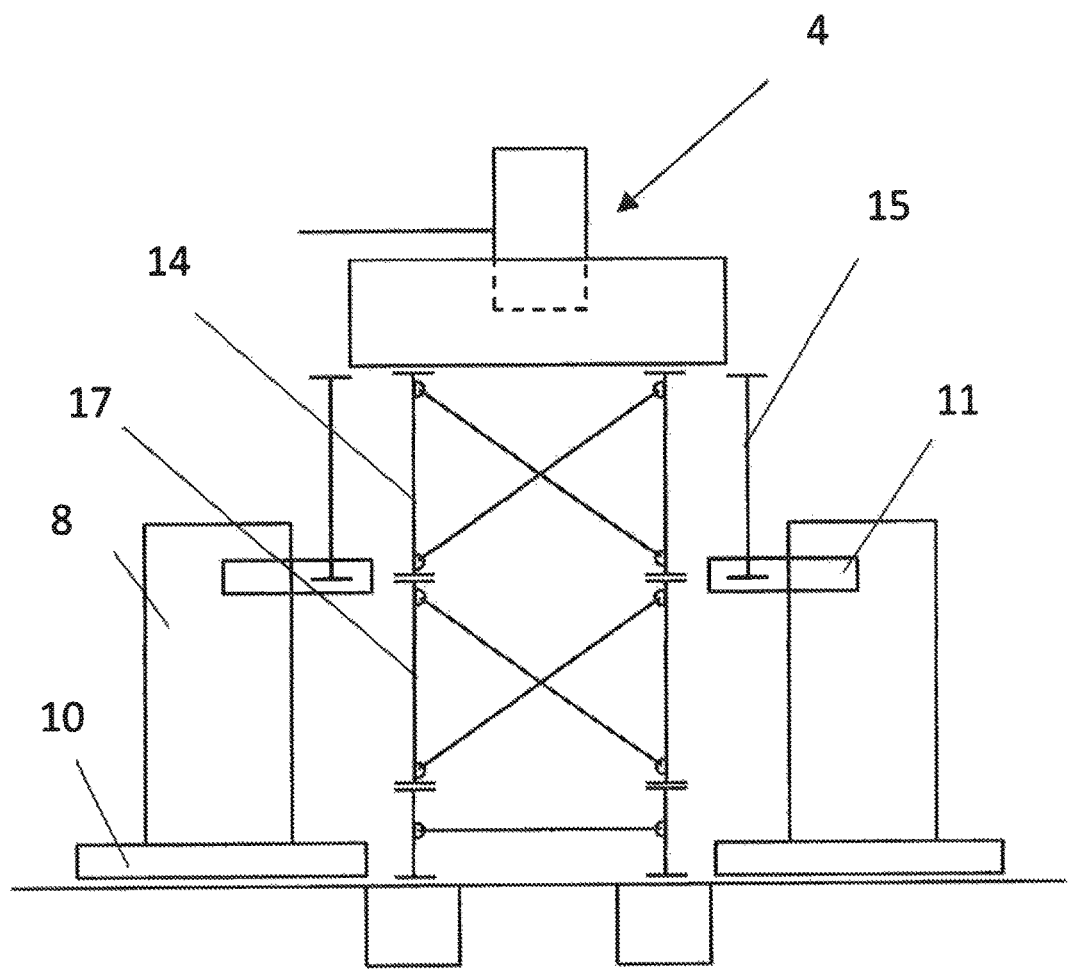
Figure 13:
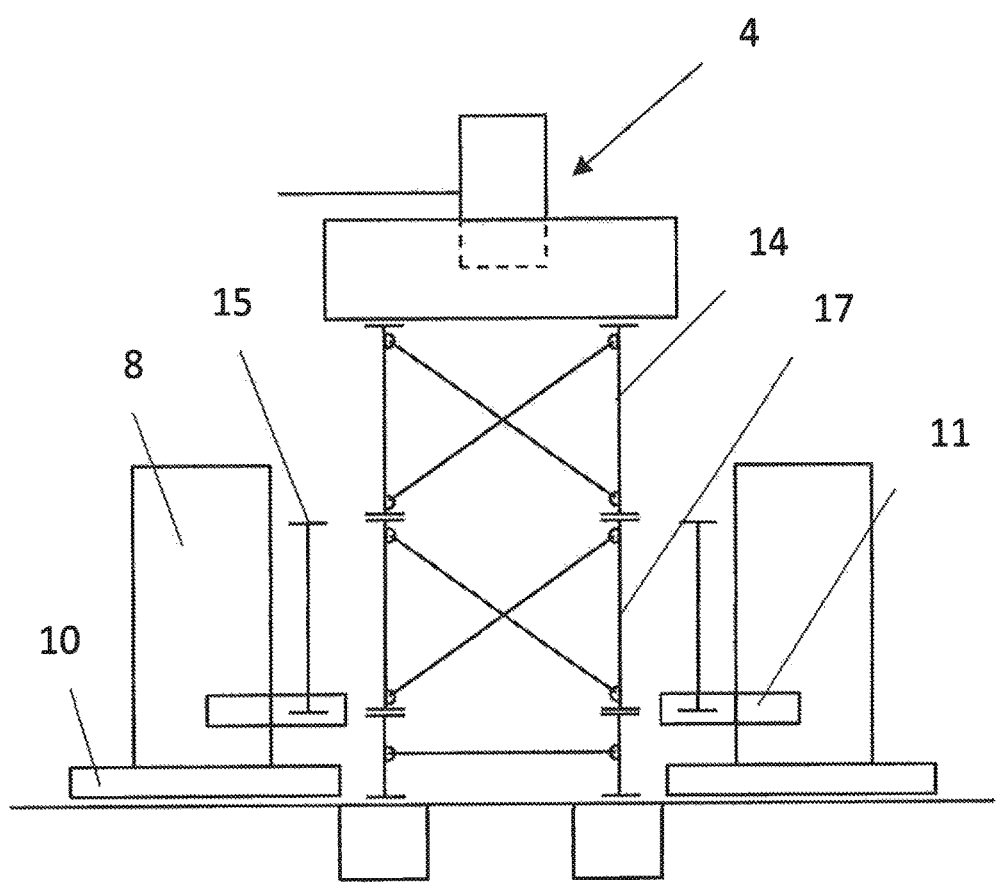

FIG. 9 depicts an auxiliary column 15 that is anchored at one end to the lifting platform 11 and at another end to a connection flange 16 attached to the joint ring 12.

FIGS. 10, 11, 12 and 13 depict a four-step continuation of the assembly process: first lifting the assembly and, secondly, introducing a new tower module 17 and anchoring the modules 14, 17 and 7 together. The connection flanges 16 are then released followed by a lowering of the lifting platforms 11 and associated auxiliary columns 15.

Figure 14:
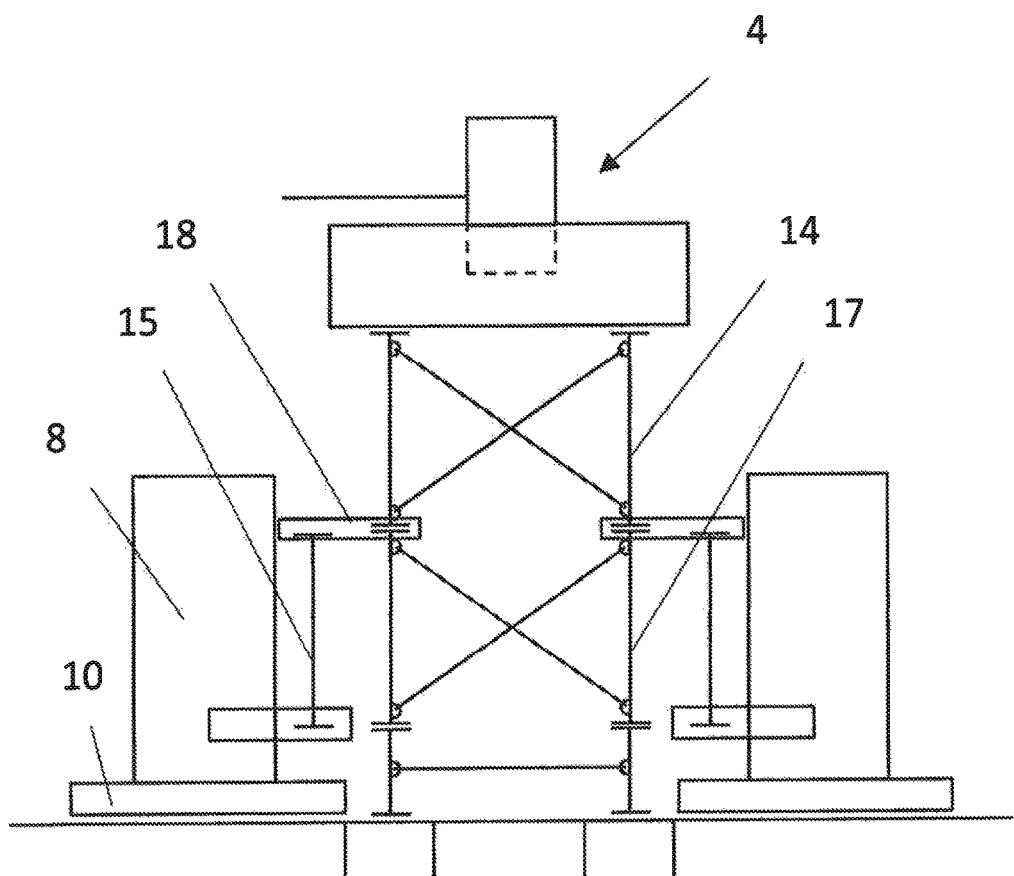

FIG. 14 depicts the use of a connection part 18 as an auxiliary element to continue the assembly. This connection part 18 is anchored at the top of the auxiliary column 15, though not to the joint ring 12 as in the previous step, but rather to the joint between module 14 and module 17.

Figure 15:
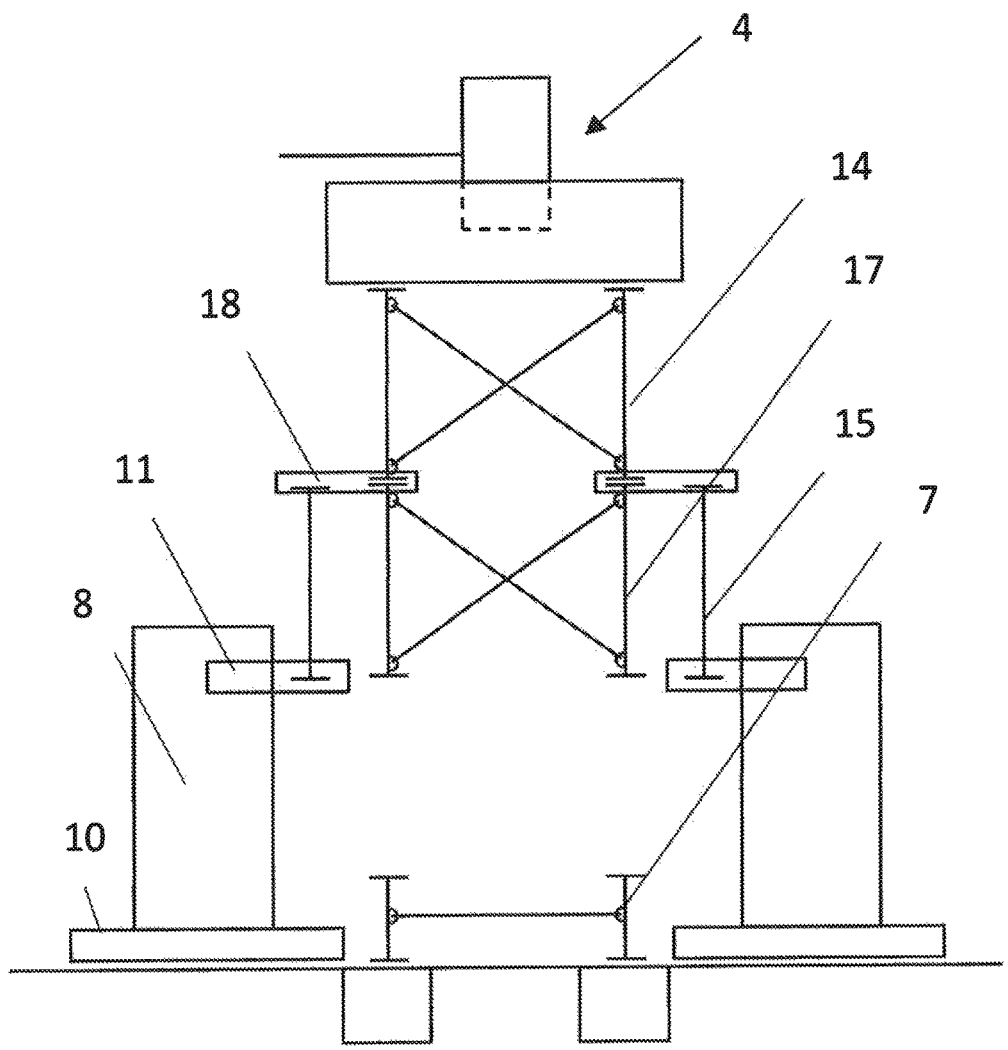
Figure 16:
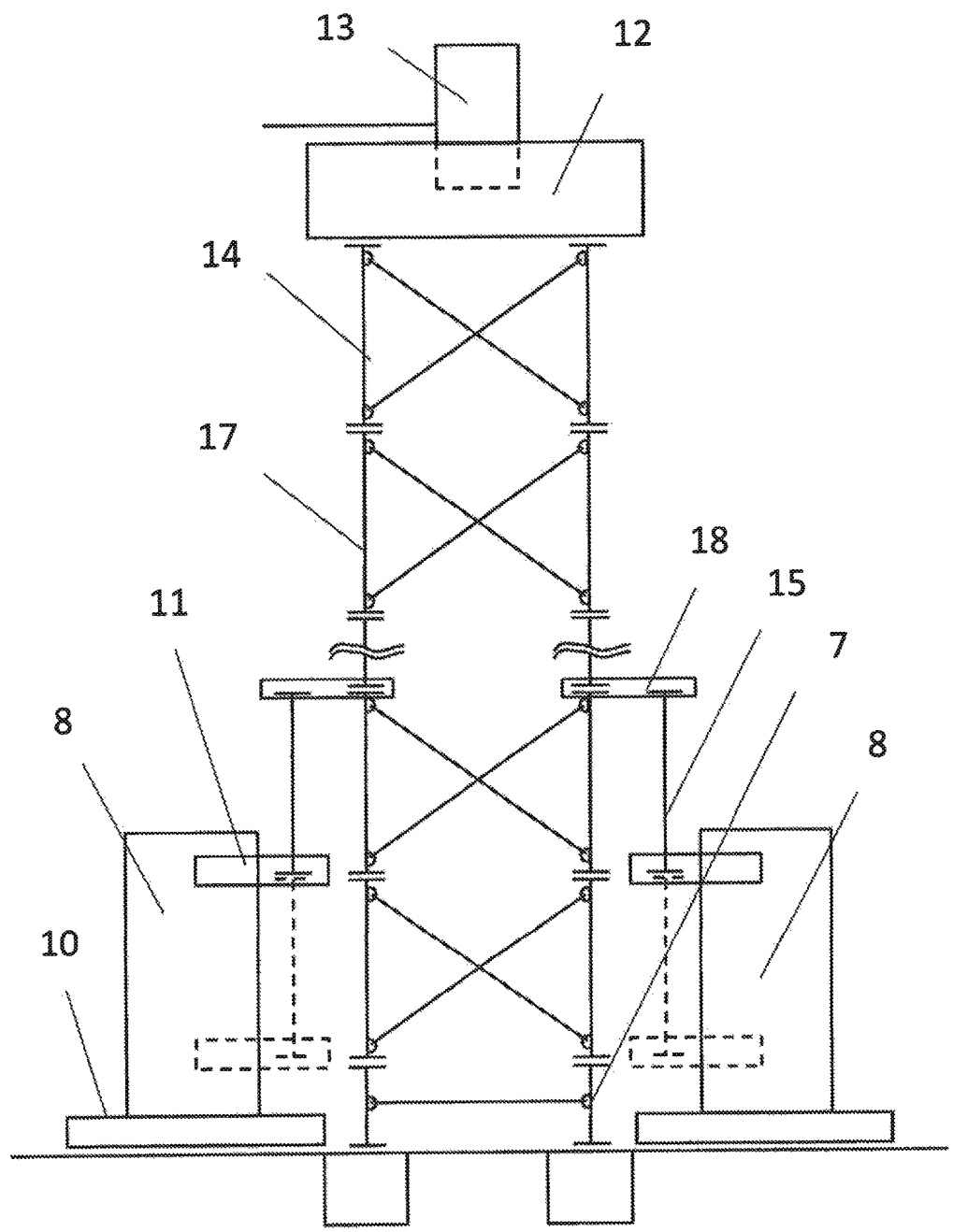
FIG. 16 is a view of a last tower section being lifted.

FIG. 15 illustrates the continuation of the process for lifting the nacelle 4 and the two assembled tower modules 14 and 17, followed by the mounting of a further module (not shown in the figure) between the basic tower module 7 and the tower module 17. Likewise, the new module is anchored to tower module 17 and the basic tower module 7. The connection parts are then released and the lifting platforms lowered. This step is repeated until all the tower modules have been installed as shown in FIG. 16.

Figure 17:
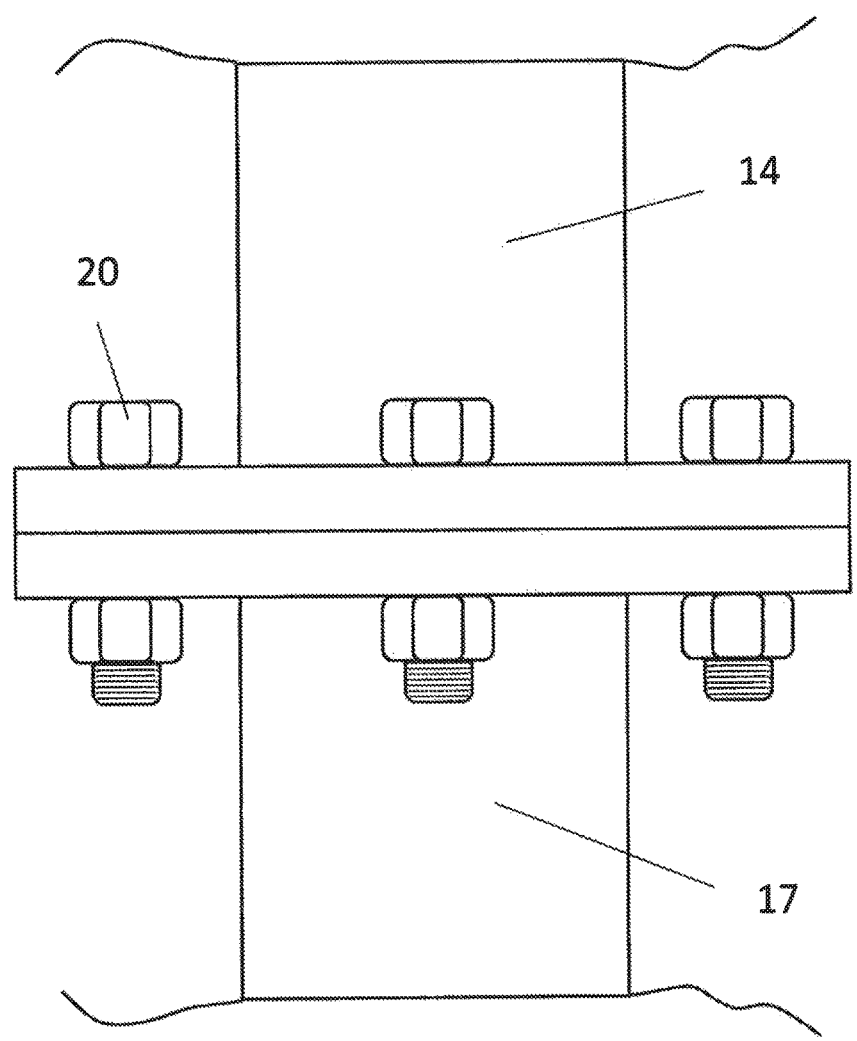
FIG. 17 depicts a detail of tower module connections according to one embodiment.

The fastening elements shown in FIG. 17 represent the joint between modules, e.g., the joint between the upper tower module 14 and the basic tower module (7) shown in FIGS. 8 and 9, or the joint between modules 14 and 17 shown in FIG. 14.

Figure 18A:
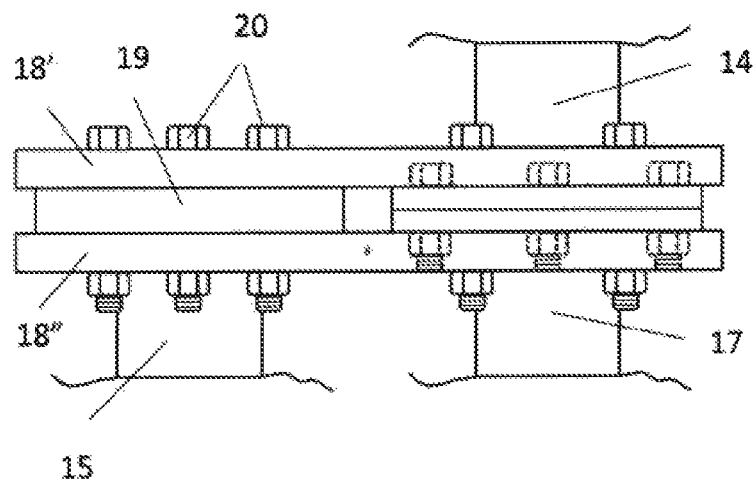
FIGS. 18A and 18B respectively depict front and plan views of the details of a connection part joint between an auxiliary column and a tower module.
Figure 18B:
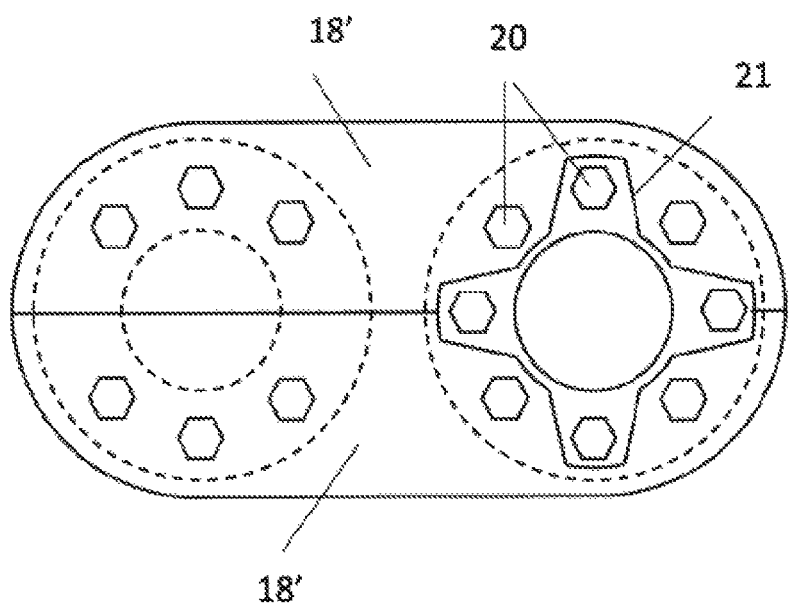

FIGS. 18a and 18B depict connection part 18 between the auxiliary column 15 and the tower columns 14 and 17. The auxiliary column 15 may comprise a circular flange 19 situated between the two parts constituting the connection part 18: the upper part 18' and the lower part 18". The ends of the connection part 18 may be circular and have through holes for fitting the corresponding fastening elements 20. The dotted line in this same front view shows the bolts 20 joining the two tower modules (e.g., 14 and 17). Again, the upper part 18' and lower part 18" of the connection part 18 are arranged to "sandwich" the tower module joint. Likewise, the circular end of the connection part 18 corresponding to the joint between modules may have a cross-shaped easing 21 to keep the bolts 20 on the joint accessible. This end also has through holes on the edge of the easing 21 for inserting the corresponding fastening elements.

Each connection part 18' and 18" is subdivided into two parts to mount them from the side around the columns of the modules. This subdivision generates two symmetrical parts: one for the left and the other for the right.

The connection flange 16 may have the same configuration as the connection part 18, differing in the positioning of the easing 21 and the manner of anchoring to the joint ring 12.

Figure 19:
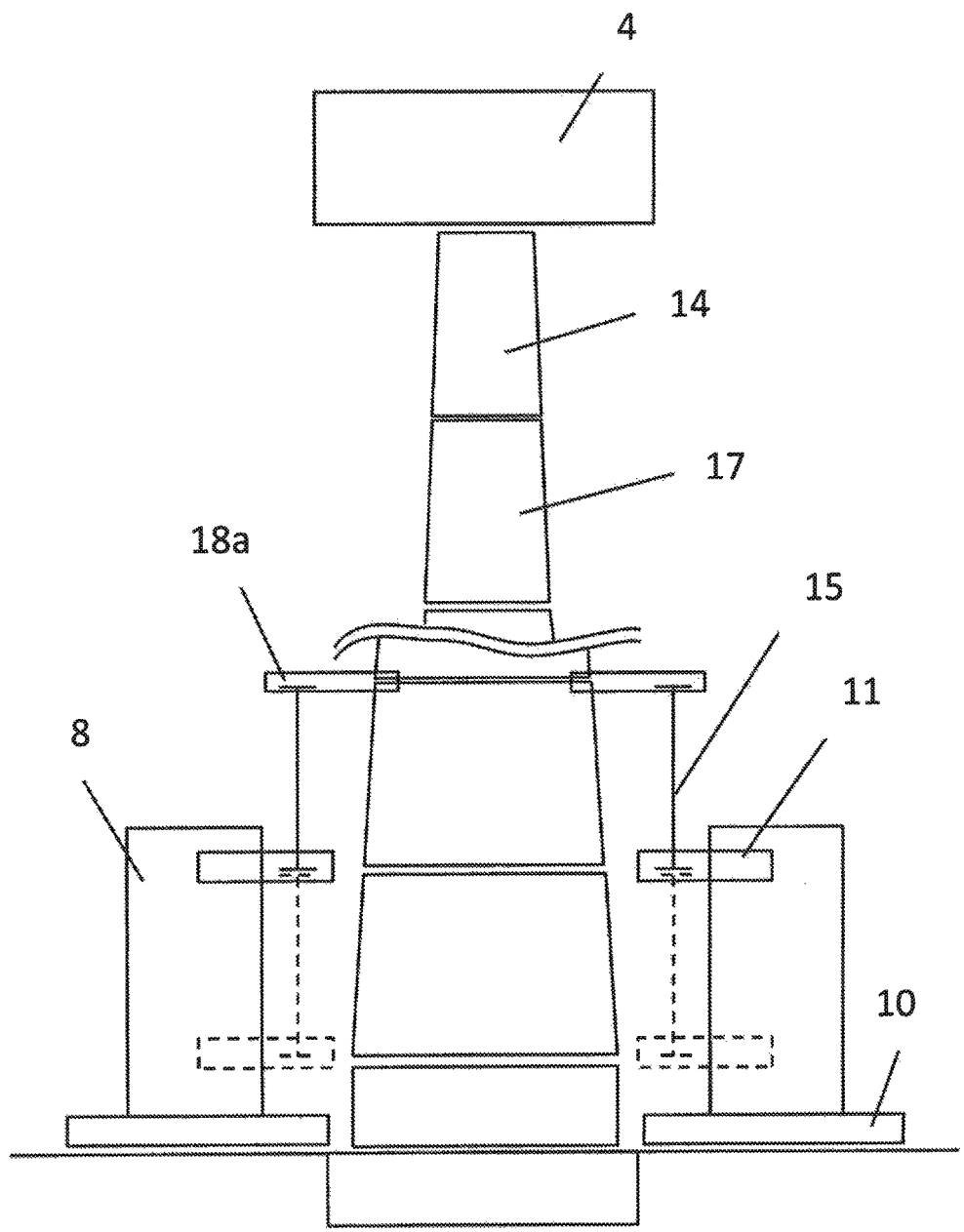
FIGS. 19, 20, 21A and 21B depict another embodiment involving a solid truncated-cone tower and the details of a joint between modules and a connection part.
Figure 20:
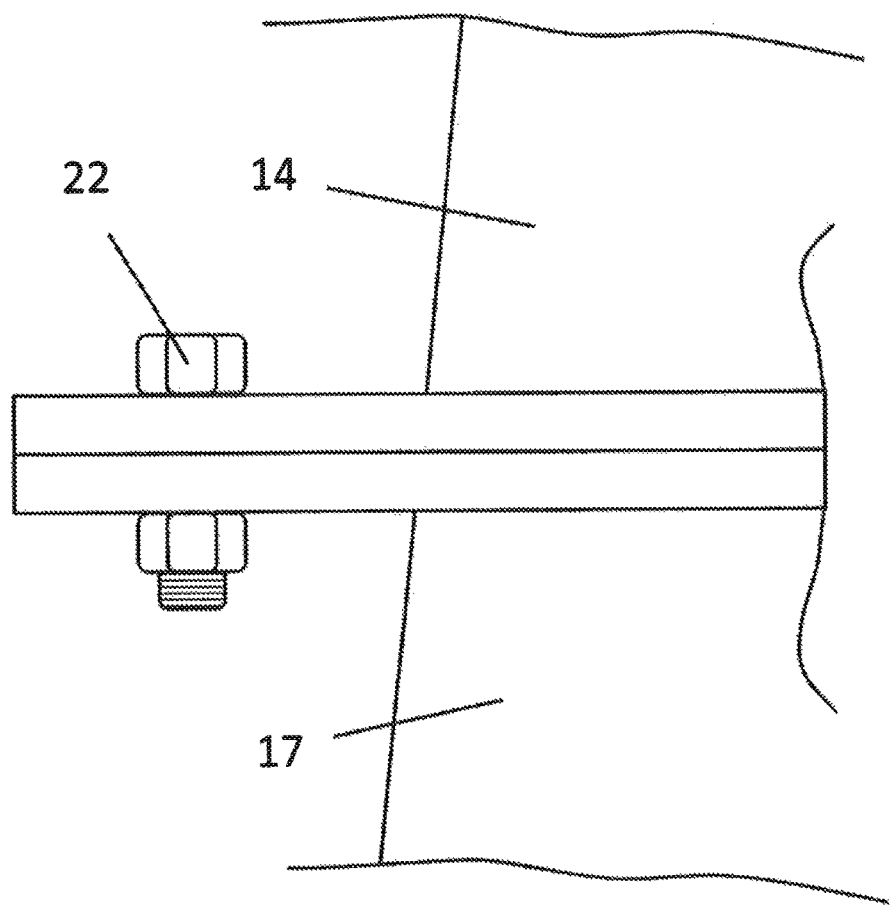
Figure 21A:
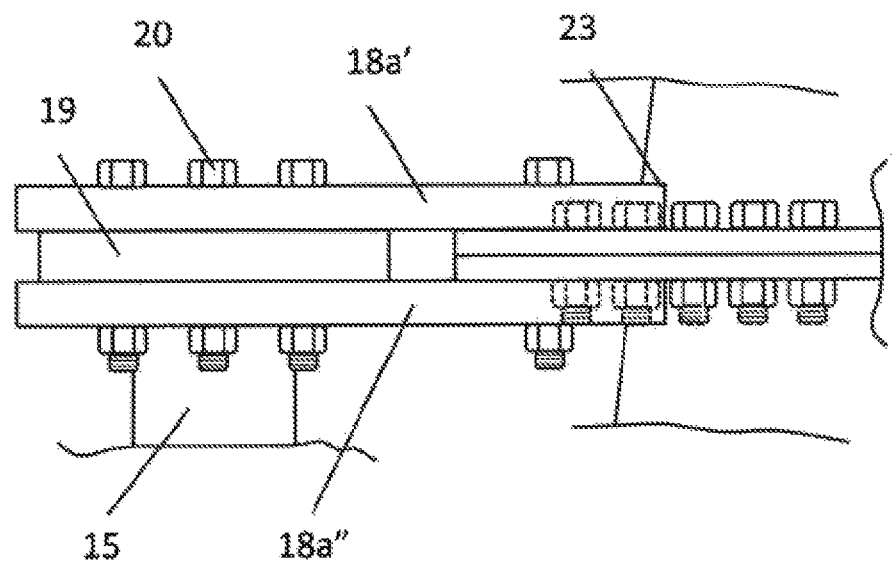
Figure 21B:
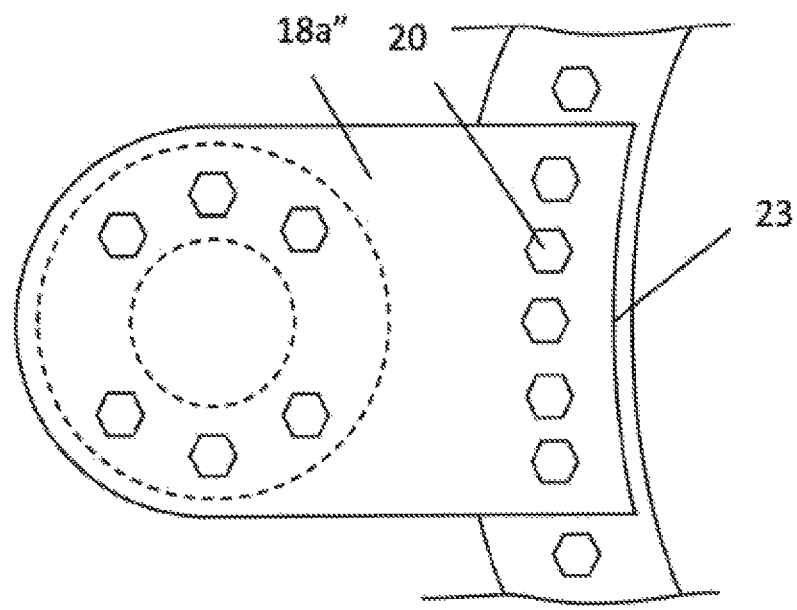

FIG. 19 depicts the assembly of a wind turbine having a tower that comprises solid truncated-cone rings, which could be made of metal, concrete or any other material. Connection parts 18a of different lengths or an extendable platform 11 may be used to assemble the truncated-cone modules. FIG. 20 depicts a joint 20 between truncated-cone modules 14 and 17. FIGS. 21A and 21B illustrate a connection part 18a that comprises an upper part 18a' and a lower part 18a", that will be assembled directly to the joint 20 of the truncated-cone modules. In the embodiment of FIG. 21 the connection part is fastened to the auxiliary column 15 as described above, while the other end has a curved shape 23 to adapt to the curvature of the joint 20 between truncated-cone modules.

Figure 22:
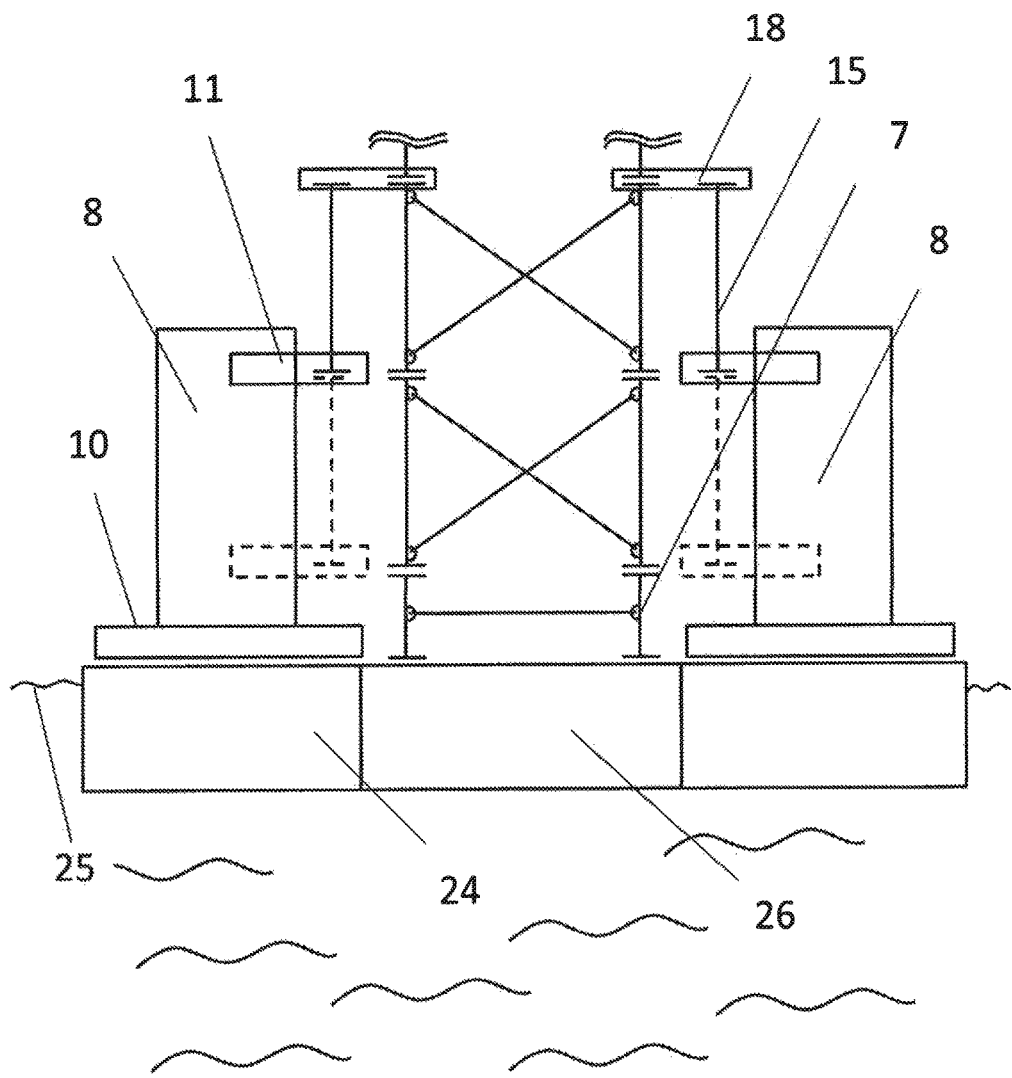
FIG. 22 is a front view of a pre-assembly of the underwater tower on a floating platform.
Figure 23:
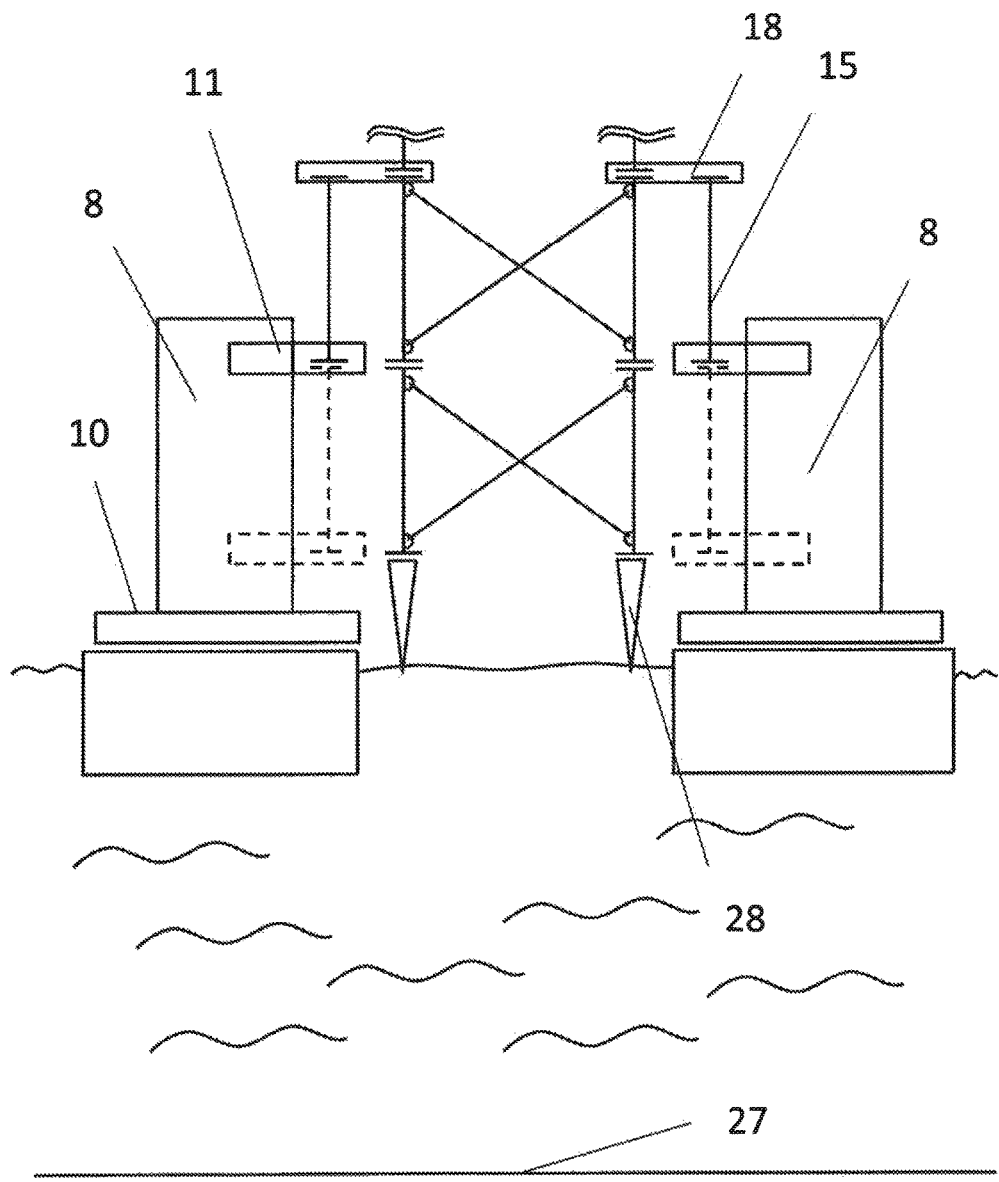
FIGS. 23, 24, 25, 26, 27 and 28 illustrate the stages of submerging an underwater tower, according to one embodiment, before mounting the tower and nacelle.

FIG. 22 depicts an embodiment associated with a floating platform 24 prepared for erecting an offshore wind turbine using a assembly system similar to that previously described with certain variations. The system and method associated to the floating platform (24) involves first mounting an underwater section before the remainder of the wind turbine. The floating platform 24 rests at sea level 25 and supports the corresponding lifting systems 8. A retractable platform 26 is established between the floating platforms 24 and is used to support a basic tower module 7. In this case, the first step is not mounting the nacelle but rather installing the underwater module, which is configured to be submerged below sea level. The basic tower module 7 is thus mounted before installing the upper underwater tower module 14, lowering the lifting platforms 11, installing the auxiliary column 15 and connection part 18, lifting the upper underwater tower module 14, and mounting the module 17 and successive modules until completing the distance between the floating platform 24 and the seabed 27. Completion of this stage is followed by disconnecting the basic tower module 7, opening the retractable platform 26 and mounting the anchor system to the seabed 28 as shown in FIG. 23.

An additional support 29 is in the process of anchoring the underwater section to the seabed and, with the assistance of the same lifting system 8, submerging the underwater section to the seabed 27.

Figure 24:
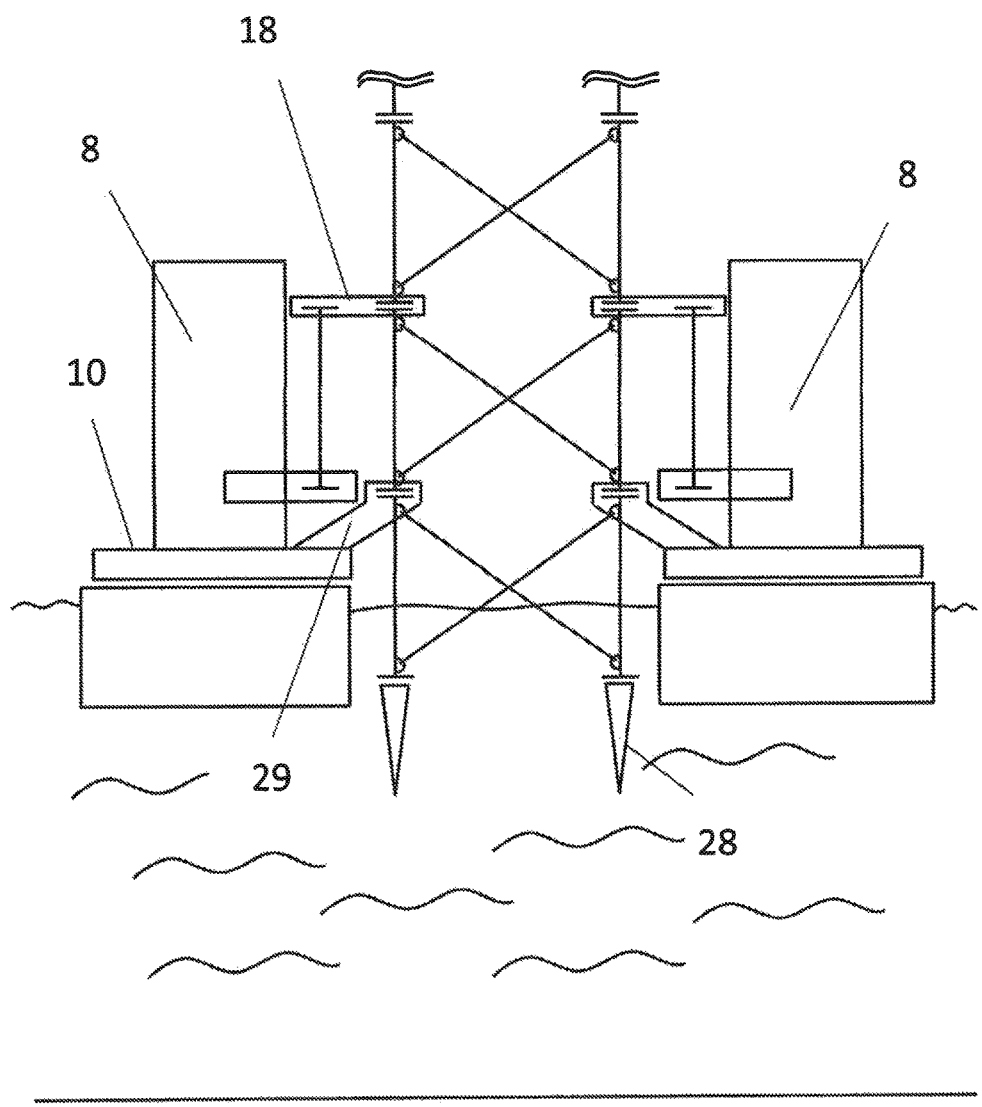
Figure 25:
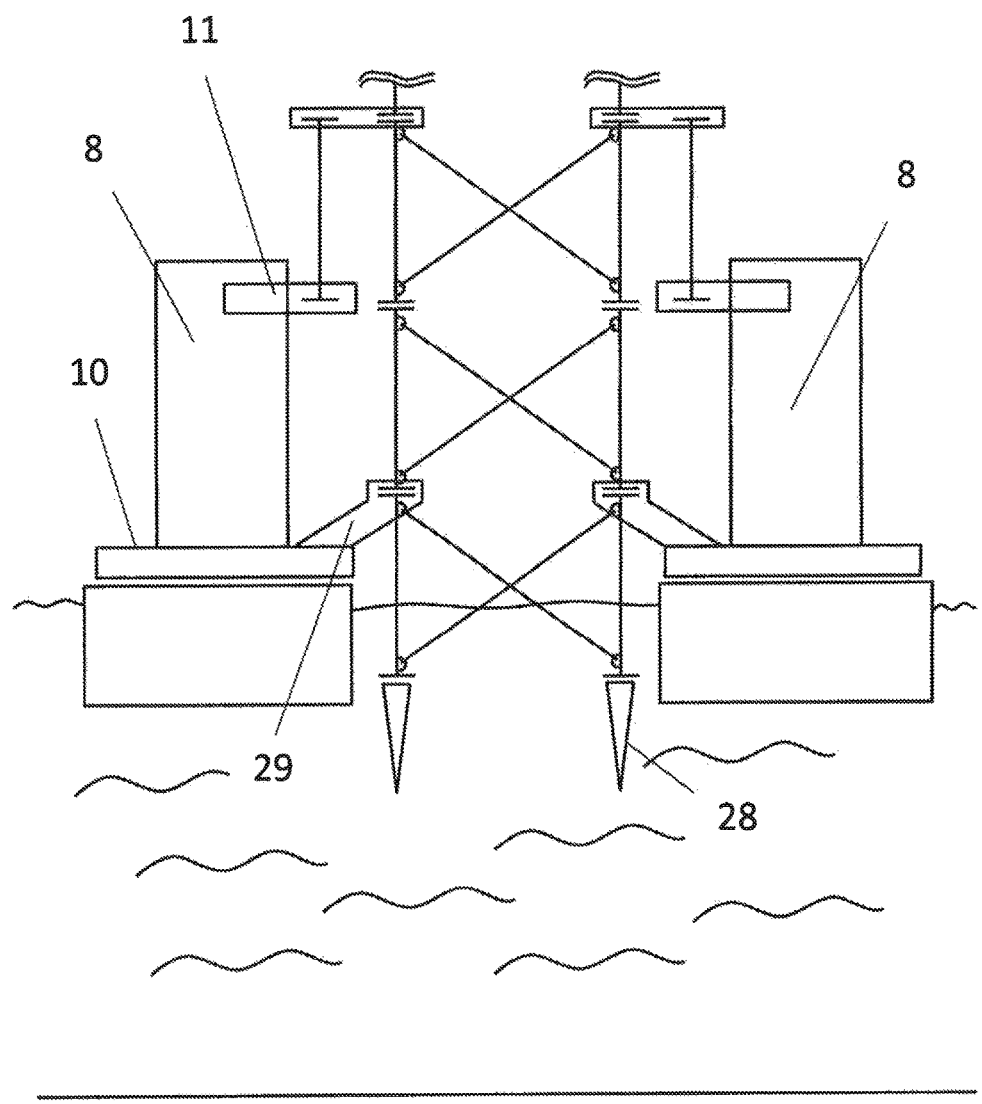
Figure 26:
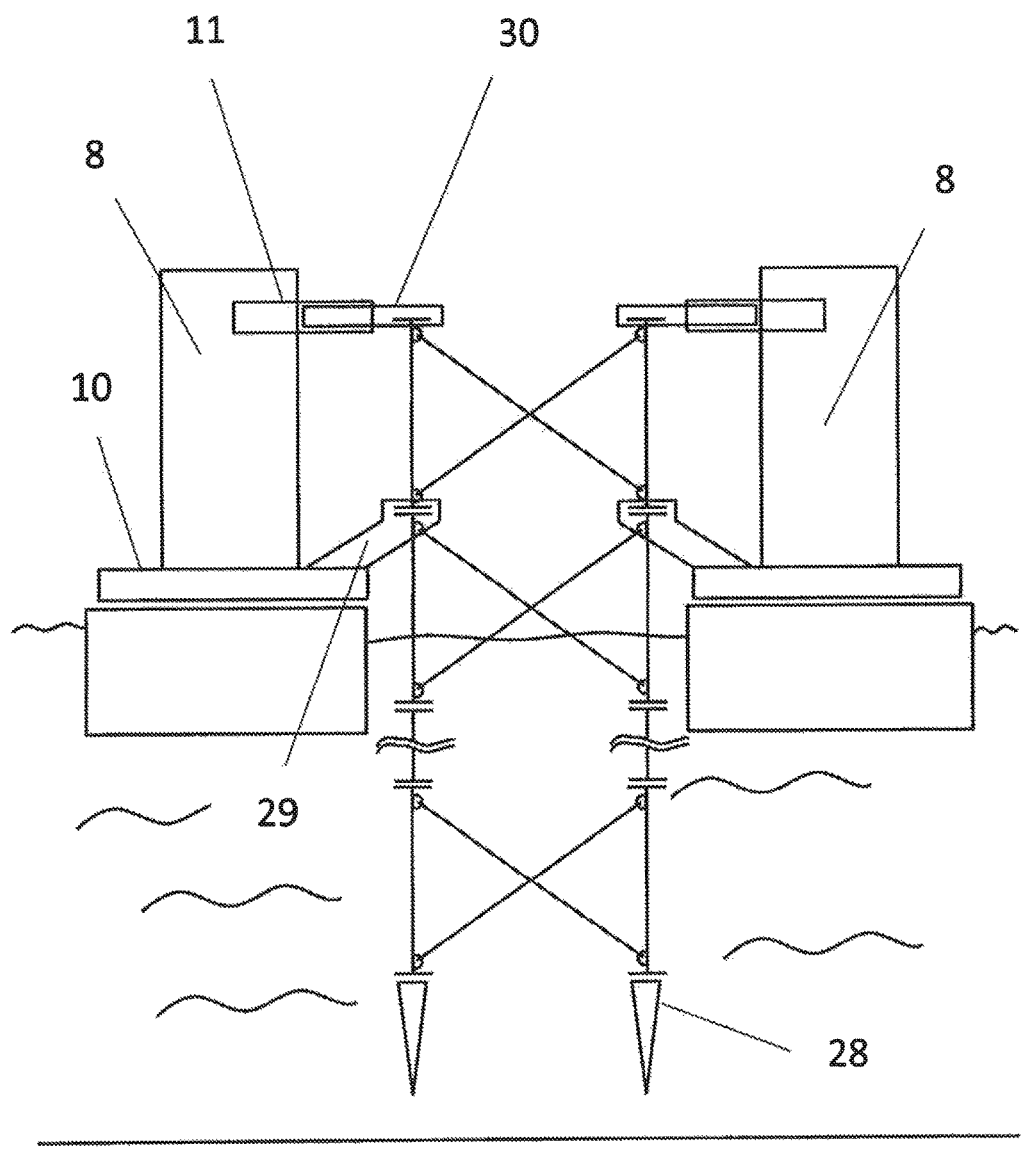
Figure 27:
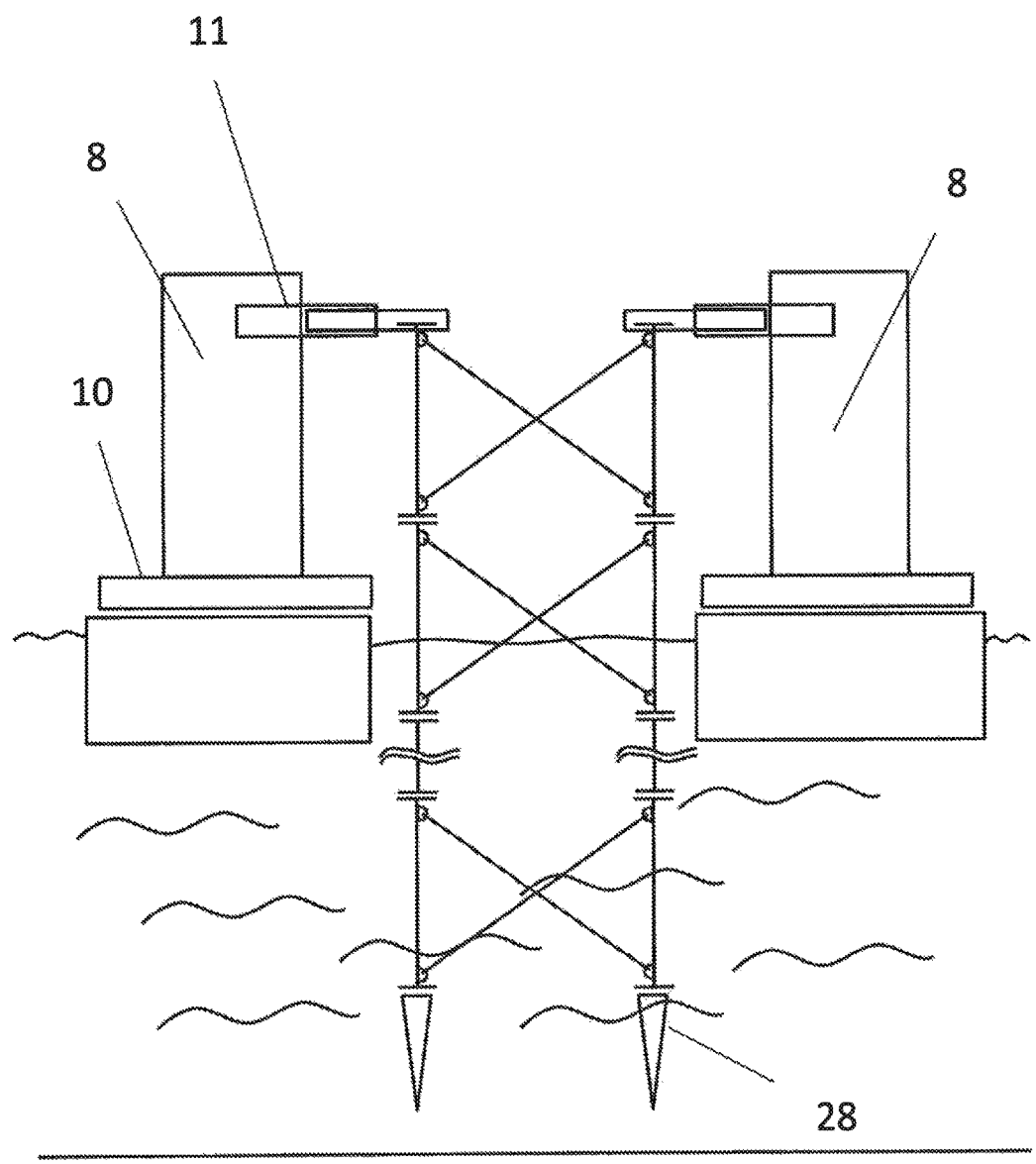
Figure 28:
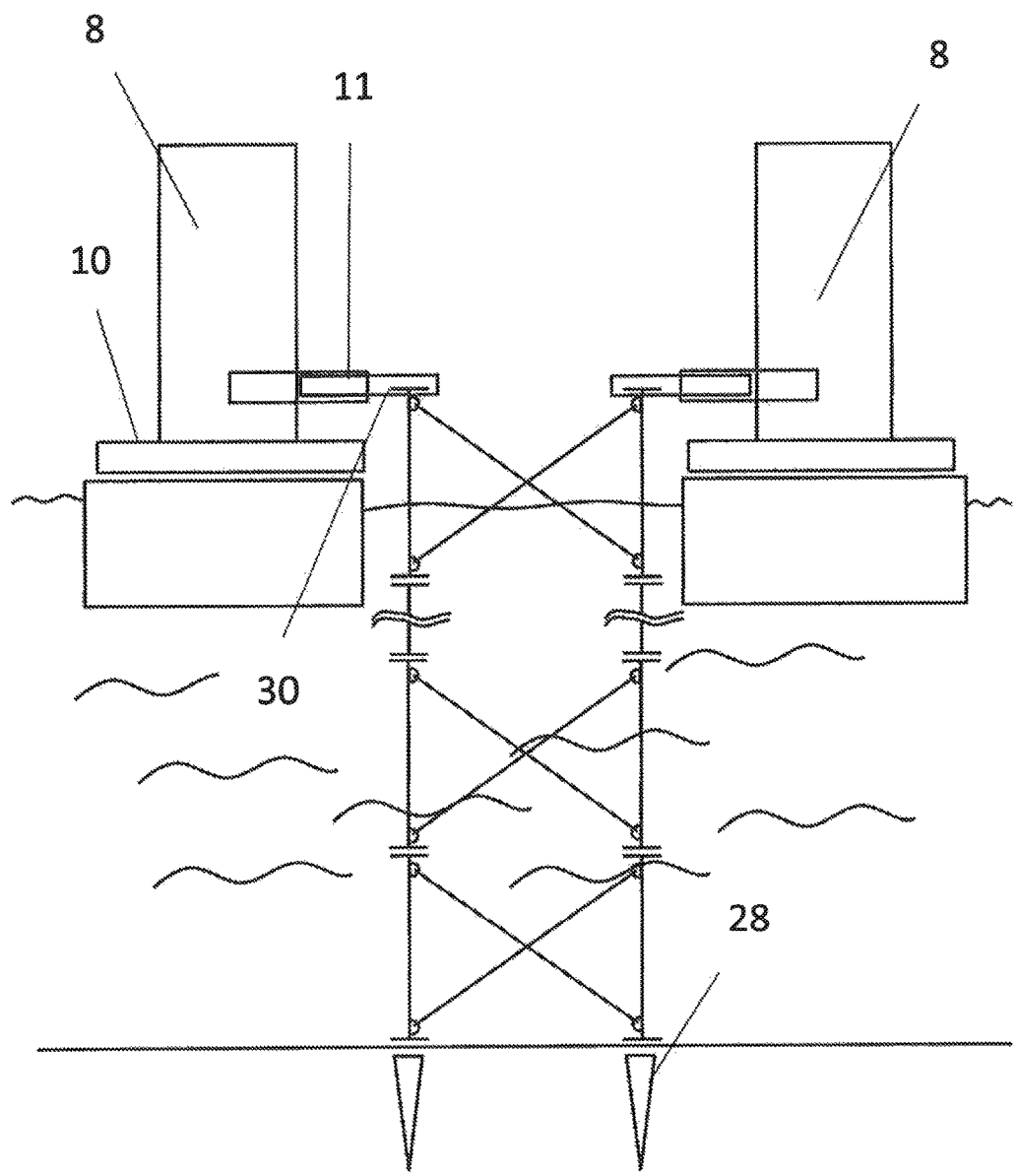

FIGS. 24 and 25 illustrate how, assisted by the additional support part 29, the lifting platforms 11 lower the modules. In the final step, when the part has yet to be submerged and is still at the level of the lifting system 8, instead of using the auxiliary column 15 and connection element 18, a direct connection part 30 is used as shown in FIGS. 26, 27 and 28.

Figure 29A:
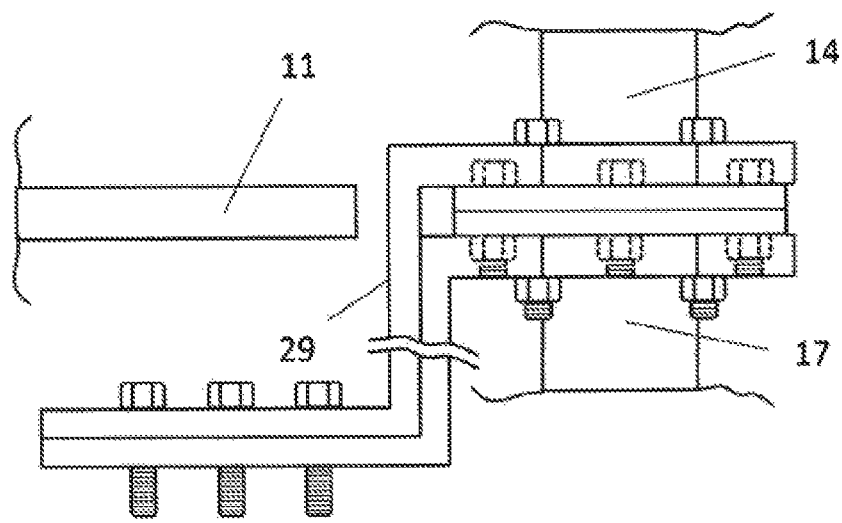
FIGS. 29A and 29B respectively depict front and plan views of an additional connection part
Figure 29B:
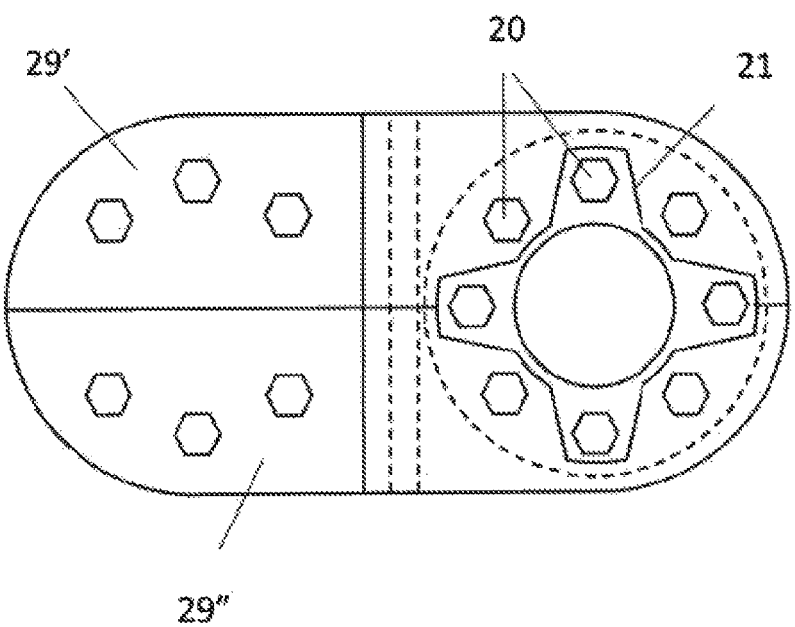

FIGS. 29A and 29B depict the additional support part 29 arranged in a staggered and slanting manner so as not to interfere with the lifting platform 11 from the base 10 of the lifting system 8 to the joint between modules 14 and 17. This additional support part 29 comprises two parts 29' and 29", subdivided into two parts to mount them from the side around the columns of the modules. The circular end of the additional support part 29 has a cross-shaped easing 21 to keep the bolts 20 on the joint accessible.

Figure 30A:
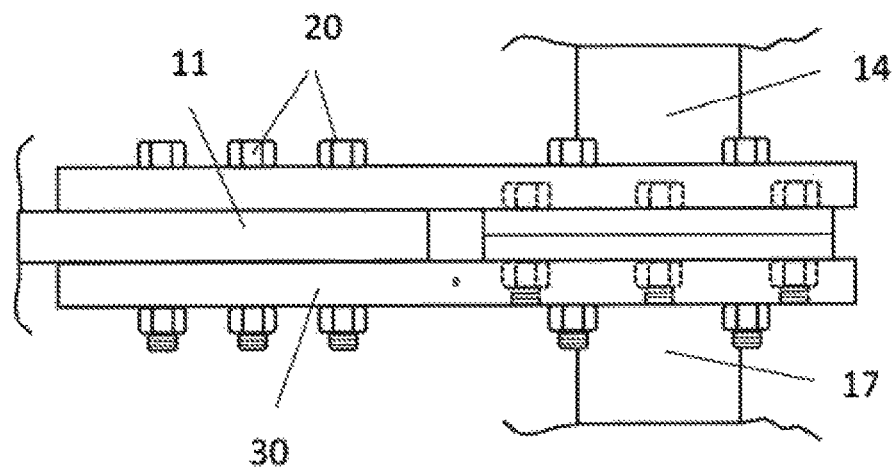
FIGS. 30A and 30B illustrate a direct connection part used with a lifting platform.
Figure 30B:
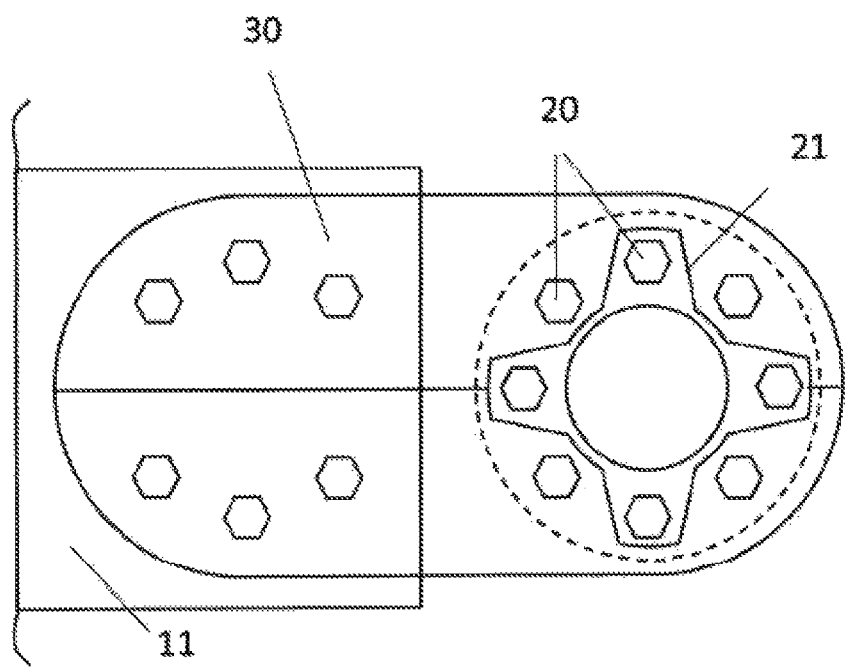

FIGS. 30A and 30B depict the direct connection part 30 comprising two equal parts in a sandwich arrangement over the lifting platform 11 and joints between tower modules 14 and 17. This part also comprises two parts 30' and 30". In this case, the circular end of the direct connection part 30 also has a cross-shaped easing 21 to keep the bolts 20 on the joint accessible.

After securing the underwater tower section, the original process as disclosed above may then be followed to erect the entire wind turbine on the anchored underwater section as if it were a ground foundation.

According to one embodiment a method for lifting the nacelle 4 and tower 3 of a wind turbine is provided. The foundation for the lifting process may be on the ground or on a previously mounted underwater section in offshore applications.

The method may include: (a) preparing a foundation 5 or a retractable platform 26 for supporting a basic tower module 7; (b) installing the basic tower module 7 so that it is supported on the foundation 5 or retractable platform 26; (c), mounting the lifting systems 8 so that they are peripherally disposed about the basic tower module 7; (d) fastening a nacelle 4 (that generally includes a drive train, generator 13, bench and joint ring 12) to a lifting platform 11 of each of the lifting systems 8; (e) vertically lifting the nacelle 4 by use of the lifting systems 8; (f) mounting an upper tower module 14 to the nacelle 4 and the basic tower module 7; (g) disconnecting the lifting platform 11 of each of the lifting systems 8 from the nacelle 4 and lowering the lifting platforms 11; (h) installing an auxiliary column 15 on each of the lifting platforms 11; (i) coupling a top portion of each of the auxiliary columns to the nacelle 4 by the use of a first connector and disconnecting the upper tower module 14 from the basic tower module 7, (j) raising the lifting platforms 11 to lift the nacelle and also the upper tower module 14 that is fastened to the nacelle up and away from the basic tower module 7; (k) mounting another upper tower module 17 to a bottom of the previously installed upper tower module 14 and to the top of the basic tower module 7; (l) disconnecting the auxiliary columns from the nacelle 4; (n) lowering the lifting platforms 11 and removing the first connectors from the auxiliary columns, (o) attaching a second connector different than the first connector to the top portion of each of the auxiliary columns; (p) fastening the second connectors to a location where the upper tower modules 14 and 17 are attached to one another and disconnecting the upper tower module 17 from the basic tower module 7; (q) raising the lifting platforms 11 to lift the nacelle and also the upper tower modules 14 and 17 that are coupled to the nacelle up and away from the basic tower module 7. Steps (r) through (q) may be repeated to add additional upper tower modules as desired until completion of the assembly.

A method, according to one embodiment, for lifting the nacelle 4 and tower 3 of a wind turbine on the ground or offshore with a previously mounted underwater section is detailed below:

Prepare the foundation 5 or retractable platform 26
Install the basic tower module 7
Mounting the lifting systems 8
Fastening the nacelle 4 [drive train, generator 13, bench and joint ring 12]
Lifting the nacelle 4
Mounting the upper tower module 14
Lowering the lifting platforms 11
Installing the auxiliary column 15 and connection flange 16
Lifting the nacelle 4 with the upper tower module 14
Installation of the module 17
Disconnecting the auxiliary column 15
Lowering the lifting platforms 11
Installing the auxiliary column 15 and connection part 18
Lifting the nacelle 4 with the modules 14 and 17
Repeating with the remaining modules until completion of the assembly.

Figure 31A:
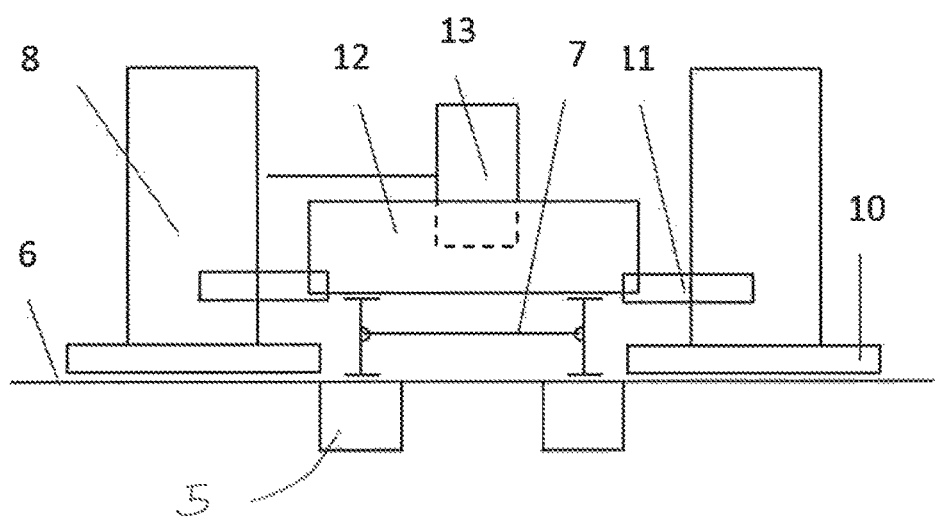
FIGS. 31A-E illustrate a method for assembling a wind turbine according to one embodiment.

FIGS. 31A-31E illustrate another method for constructing a wind turbine that does not include the use of auxiliary columns and may or may comprise the use of a basic tower module. As shown in FIG. 31A, the system includes at least two lifting systems 8 disposed peripherally about the tower foundation 5. According to some embodiments there are provided three or more lifting systems 8 that are spaced substantially equidistantly from one another about the periphery of the tower foundation. The lifting systems 8 may be coupled together by a joint structure 9, like that shown in FIG. 4.

Figure 31B:
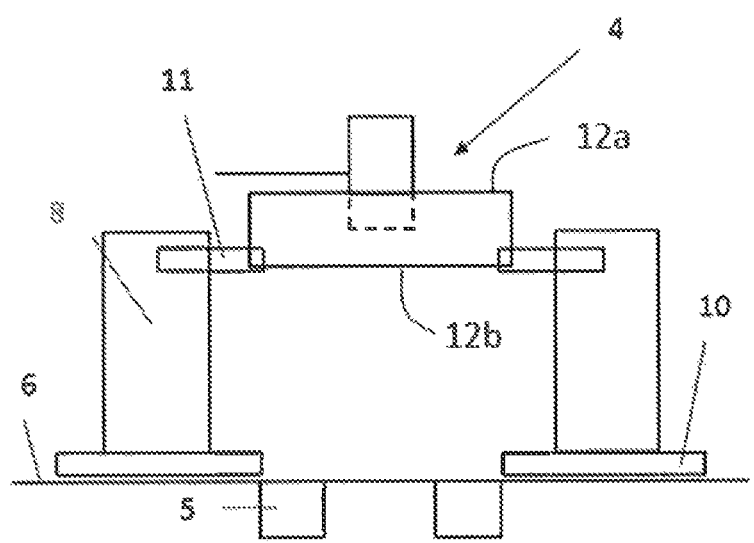

Each of the lifting systems 8 includes a lifting platform 11 that is capable of being moved vertically between a low point as shown in FIG. 31A and a high point as shown in FIG. 31B. Means by which the vertical position of the lifting platform 11 is moved may include motors, hydraulic cylinders, or other means as discussed above. The lifting platforms 11 are configured to support the bottom of the joint ring 12 of the nacelle 4 and may also be configured to be attached directly or indirectly to the bottom of the joint ring 12.

As noted above, a problem with many wind turbine assembly methods is that they require the use of structures other than the lifting systems themselves during the assembly process. For example, the method disclosed in U.S. Publication No. 2009/0087311 requires the use of stabilizing supports 61 that are anchored to the base 60 to maintain the tower modules in their vertical orientation during assembly. The method disclosed in Spanish Publication No. 2389345 also requires more than just the vertical cylinders 6 to maintain the tower modules in a vertical position during assembly. As seen in FIGS. 1-5 of Spanish Publication No. 2389345, the assembling method requires the use of a horizontally oriented clamps 4 that are located within an annular body 2 supported by a plurality of legs 3. According to at least some of the embodiments disclosed herein the lifting systems are spaced sufficiently away from the tower to counter bending moments that may occur during the assembly process. These distances may vary depending on the type and height of the towers being constructed. According to some embodiments the lifting systems 8 are spaced outwardly away from the tower under construction by a distance of between 1 to 2 meters. This facilitates the construction of tall towers in excess, of for example, 90 meters. This can include towers having a height of 160 meters or more that are capable of being constructed without stabilizers other than the lifting systems themselves.

The method of FIG. 31 may start at FIG. 31A or FIG. 31B. In the implementation of FIG. 31A, the lifting platforms 11 of lifting systems 8 are placed toward a bottom of the lifting systems 8 with the nacelle 4 being supported on a basic tower module 7. According to this implementation the joint ring 12 of the nacelle 4 is supported on each of the lifting platforms 11 while the lifting platforms are in a lower position and then raised to an elevated position as shown in FIG. 31B. As shown in FIG. 31A, the joint ring 12 is supported by the lifting platforms 11 in a manner that permits the attachment of tower modules to the bottom of the joint ring. According to some implementations first connectors are used to anchor the joint ring 12 to the lifting platforms 11.

Figure 31C:
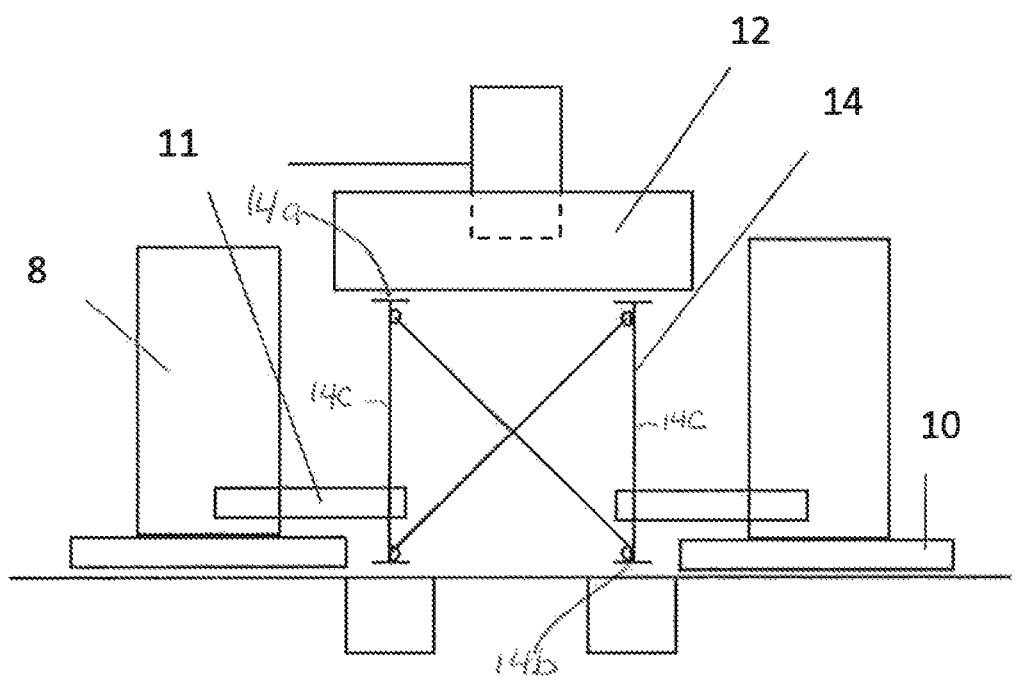

After the nacelle 4 has been lifted to an elevated position as shown in FIG. 31B, a first upper tower module 14 is placed beneath the nacelle 4 so that the bottom 14b of the tower module rests on the tower foundation 5 and so that the bottom of the nacelle 4 and the top 14a of the tower module 14 are located adjacent one another. Known means is then used to securely attach the top 14a of the tower module 14 to the nacelle 12. Upon the nacelle 4 being secured to the top of the tower module 14, the lifting platforms 11 are lowered to be positioned toward the base of their respective lifting systems 8 as shown in FIG. 31C.

Figure 31D:
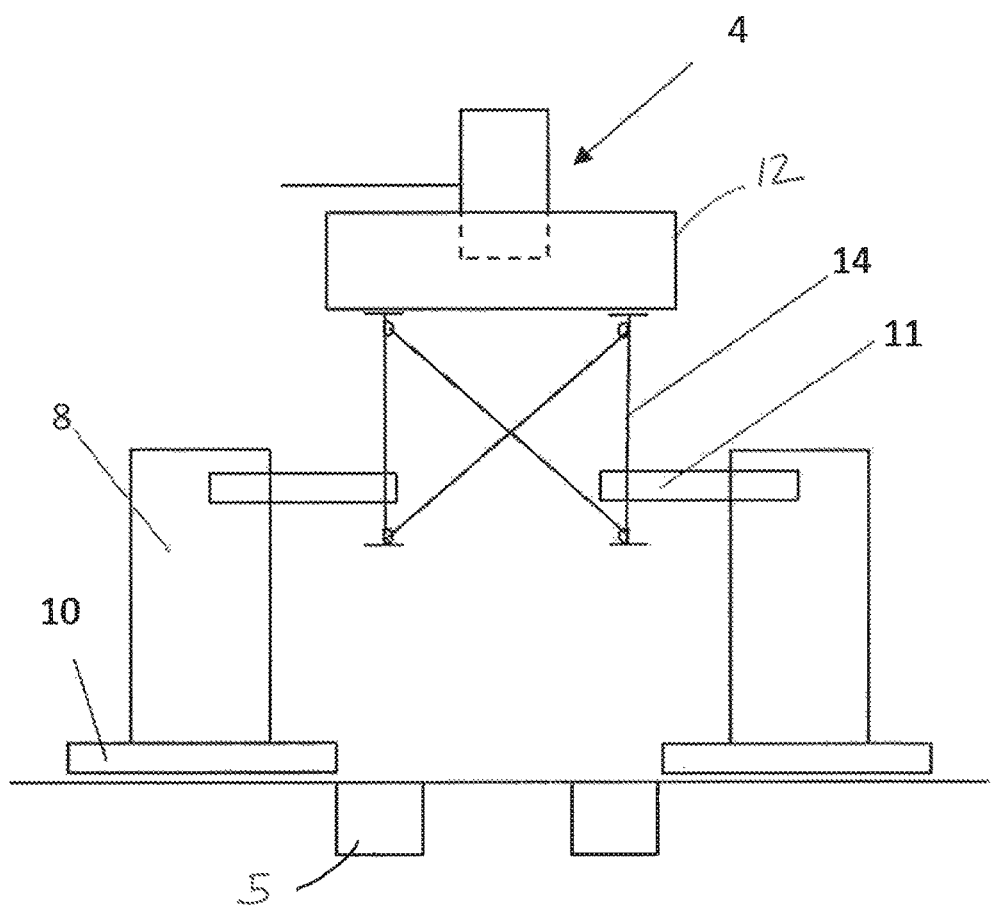
Figure 31E:
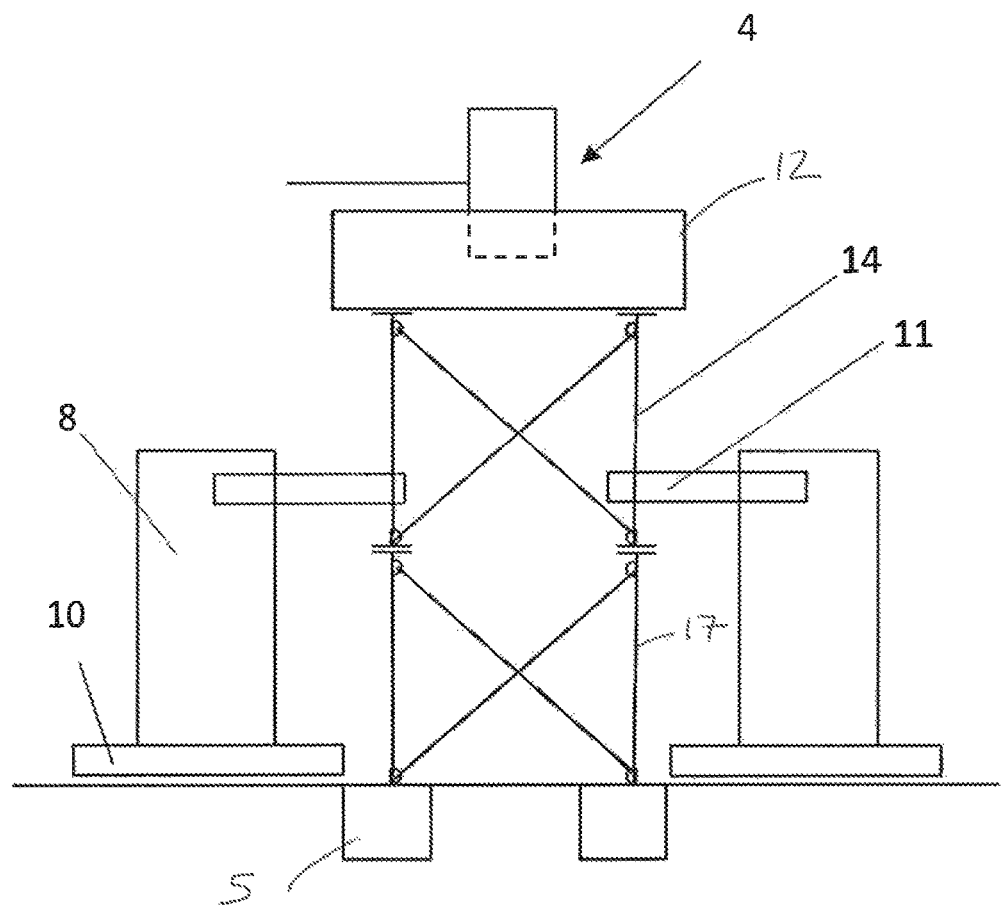

With the nacelle 4 securely attached to the top of the first upper tower module 14, the remainder of the tower may be constructed by the lifting and insertion of additional upper tower modules as shown in FIGS. 31D and 31E. With reference to FIG. 31C, this first involves securing the lifting platforms 11 to the first tower module 14 at a location located between the top 14a and bottom 14b while the lifting platforms are located toward the bottom of the lifting systems 8. According to one implementation the lifting platforms 11 are secured to a lower portion of the legs 14c of the tower module 14 as shown in the figures. This maximizes the height by which the tower module may be lifted. According to some implementations the lifting platforms 11 are secured to the upper tower modules by the use of second connectors different from the first connectors discussed above.

Figure 32:
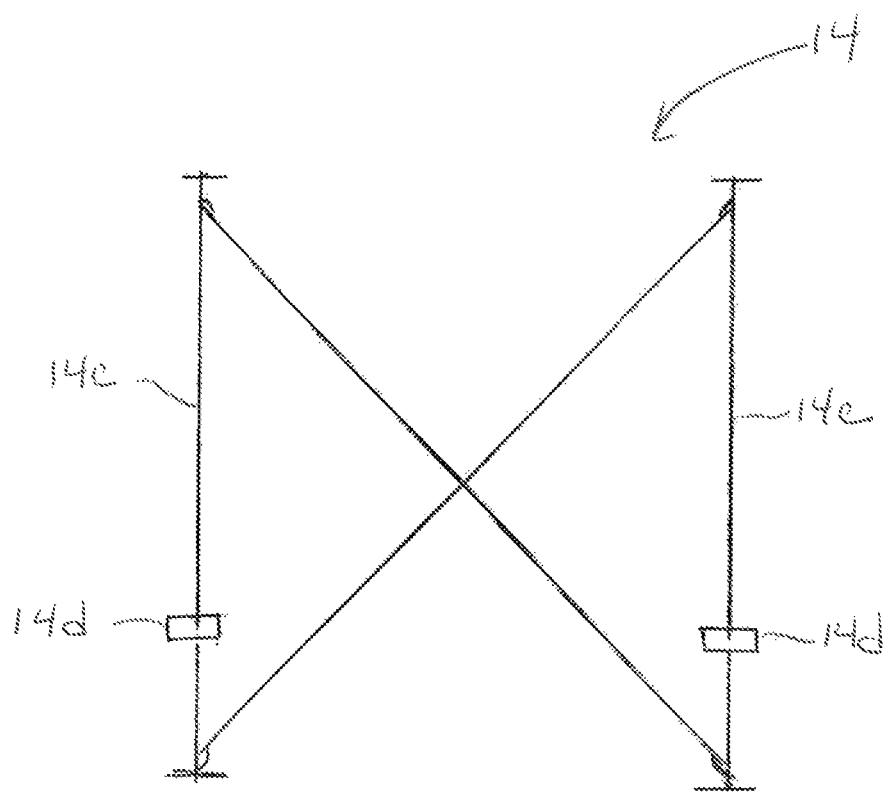
FIG. 32 illustrates a tower module according to one embodiment.
Figure 35:
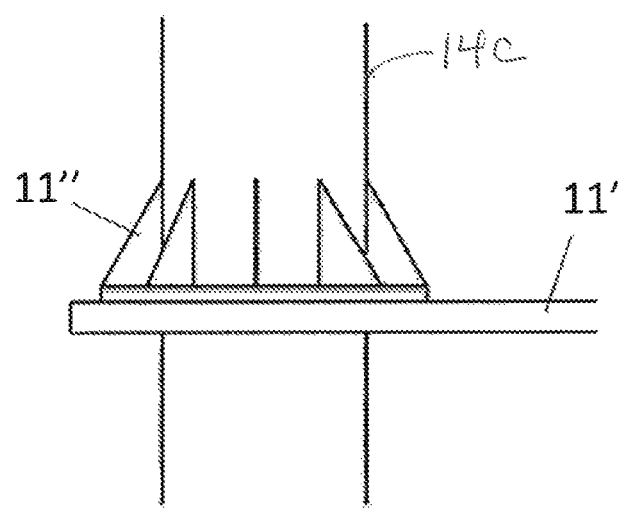
FIG. 35 illustrates a flange section that is attached to or integrated with a tower module leg according to one embodiment.

As shown in FIG. 32, one method of attaching the lifting platforms 11 to the legs 14c of the tower module 14 may include the use of flanges 14d attached to the legs or otherwise integrated as a single unit with the legs. By use of such flanges the lifting platforms 11 may be attached to the tower module 14 with a connector like that shown in FIG. 18 or in FIG. 30. FIG. 35 illustrates another example of a flange section 11" that is attached to or integrated with the tower module leg 14*c*. It is important to note that the lifting platforms 11 may be attached to the tower modules using other connector means.

Upon the lifting platforms 11 being attached to the tower module 14, the tower module 14 and the nacelle 4 attached to it are elevated by moving the lifting platforms upward as shown in FIG. 31D. The tower module 14 is lifted a distance that permits the insertion of a second upper tower module 17 below it as shown in FIG. 31E. With the second upper tower module 17 inserted below the first upper tower module 14, the first upper tower module 14 is slightly lowered so that the top of the second tower module 17 is positioned adjacent the bottom of the first tower module 14. The top of the second tower module 17 is then securely fixed to the bottom of the first tower module 14.

The process of inserting and attaching additional tower modules is repeated until the tower is completed. It is important to note that each time a tower module is placed onto the tower foundation, the bottom of the tower module may be securely attached to the foundation. If this is done, each time a tower module is lifted it must first be decoupled from the tower foundation.

It is important to note that although the figures illustrate lattice-type tower modules, the present disclosure is in no way limited to such structures. For example, the tower modules may comprise non-lattice type modules such as cylindrical modules, conical modules, etc. With respect to these other types of modules, their outer surfaces may be equipped with any of a variety of protuberances that are adapted to be coupled to or supported on the lifting platforms 11. These protuberances may be in the form of flanges, L-shaped members, inverted L-shaped members, etc.

Figure 33:
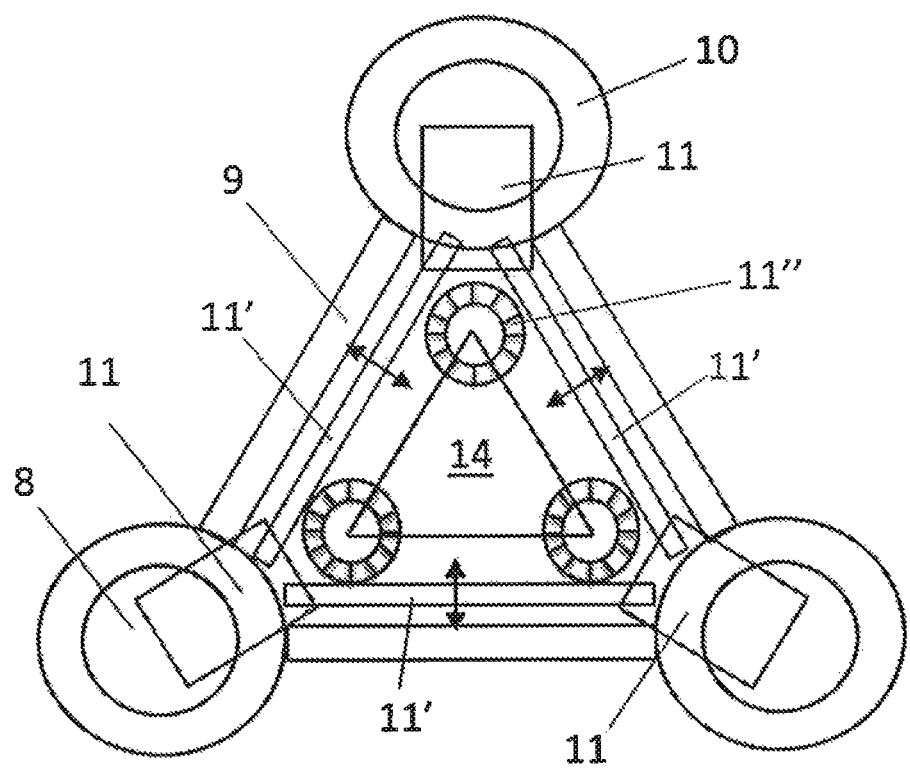
FIG. 33 illustrates a system for assembling a wind turbine according to another embodiment.
Figure 34A:
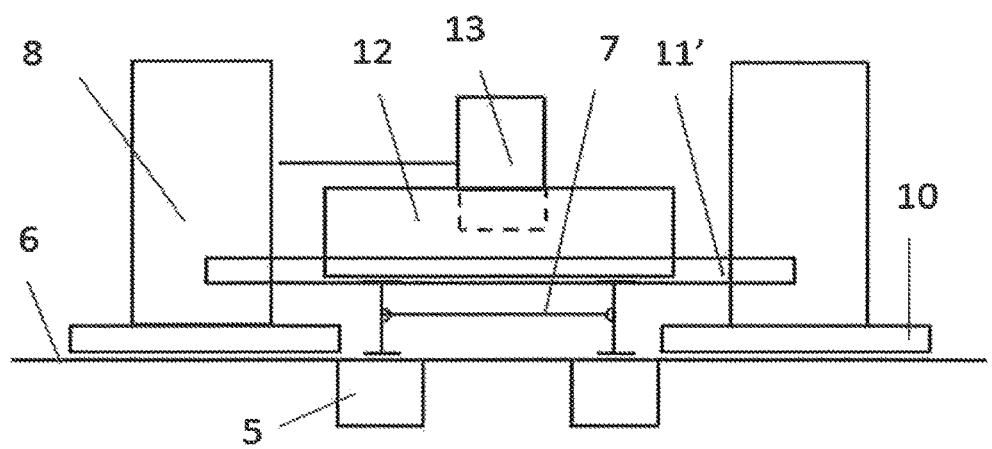
FIGS. 34A-E illustrate a method for assembling a wind turbine according to another embodiment.

FIG. 33 shows a top view of another system for constructing a wind turbine. The system is similar to those previously disclosed with the exception that the joint ring 12 of the nacelle 4 and the tower modules 14 do not directly interface with the lifting platforms 11, but instead directly interface with elongate horizontally disposed members 11' that are configured to reciprocate inward and outward between at least first and second horizontal positions as shown by the arrows in FIG. 33. In the implementation of FIG. 34 there are three lifting systems 8 that are arranged equidistantly around the tower foundation 5. Each of the members 11' spans the distance between adjacent lifting platforms 11. According to one implementation each end of the members 11' is coupled to hardware residing in or on the lifting platform. The hardware may comprise any means for causing an inward-outward movement of the members 11' as indicated by the arrows shown in FIG. 33. As will be discussed in more detail below, members 11' may be configured to support the bottom of the joint ring 12 of the nacelle 4 as shown in FIG. 34A or may be configured to interface with flanges or other types of protuberances extending from the joint ring 12. As discussed above in conjunction with FIG. 32, the tower modules 14 may also comprise flanges or other protuberances that enable a coupling of the lifting systems 8 to the tower modules. Coupling of the nacelle 4 and tower modules 14 to the members 11' occurs while the members 11' are located respectively in their first and second horizontal positions, the second horizontal position being inward of the first horizontal position. When the members 11' are decoupled from the nacelle 4 and tower modules 14 with no weight being supported on the members 11', the members 11' may be moved outward to an outer-most horizontal position to make way for the introduction of another tower module.

Figure 34B:
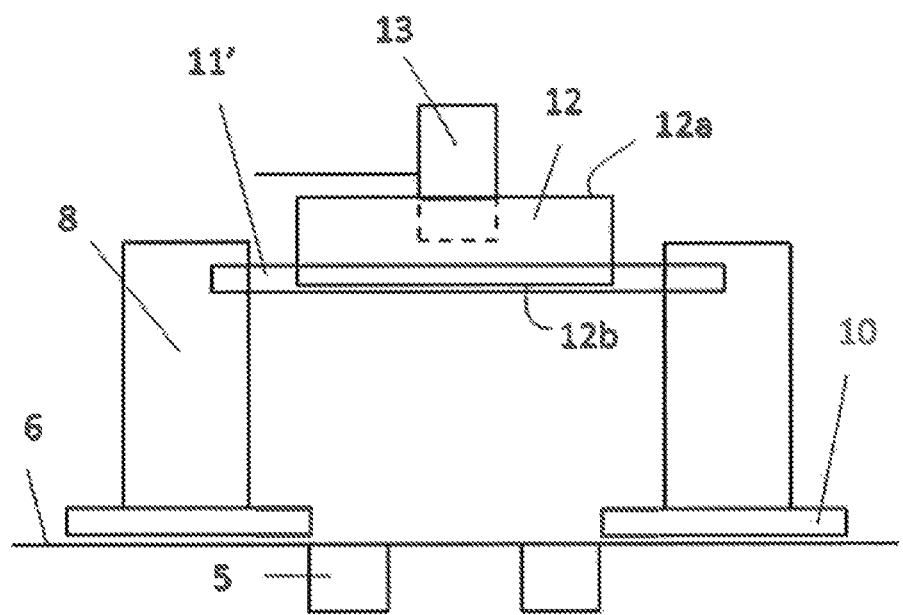

The method of FIG. 34 may start at FIG. 34A or FIG. 34B. In the implementation of FIG. 34A, the lifting platforms 11 (including members 11') are placed toward a bottom of the lifting systems 8 while the joint ring 12 of the nacelle 4 is being supported on the top of a basic tower module 7. At this time, the members 11' may be located in their outward-most positions. Prior to the nacelle 4 being raised to an elevated position as shown in FIG. 34B, each of the elongate horizontal members 11' is moved inward to its first horizontal position so that an upper surface thereof is placed underneath the nacelle 4. The lifting platforms 11 are then raised to cause the upper surfaces of the members 11' to abut and support the bottom of the joint ring 12. The lifting platforms 11 are further raised to position the nacelle 4 in the elevated position as shown in FIG. 34B. The joint ring 12 of the nacelle 14 is supported by the members 11' in a manner that leaves a majority of the bottom 12*b* of the nacelle 4 exposed to facilitate the later attachment of a top of a tower module 14 to the bottom 12*b* of the nacelle.

The nacelle 4 may be coupled to or supported on the members 11' in a manner similar to how the nacelle is coupled to or supported on the lifting platforms 11 described in the embodiments previously disclosed herein.

Figure 34C:
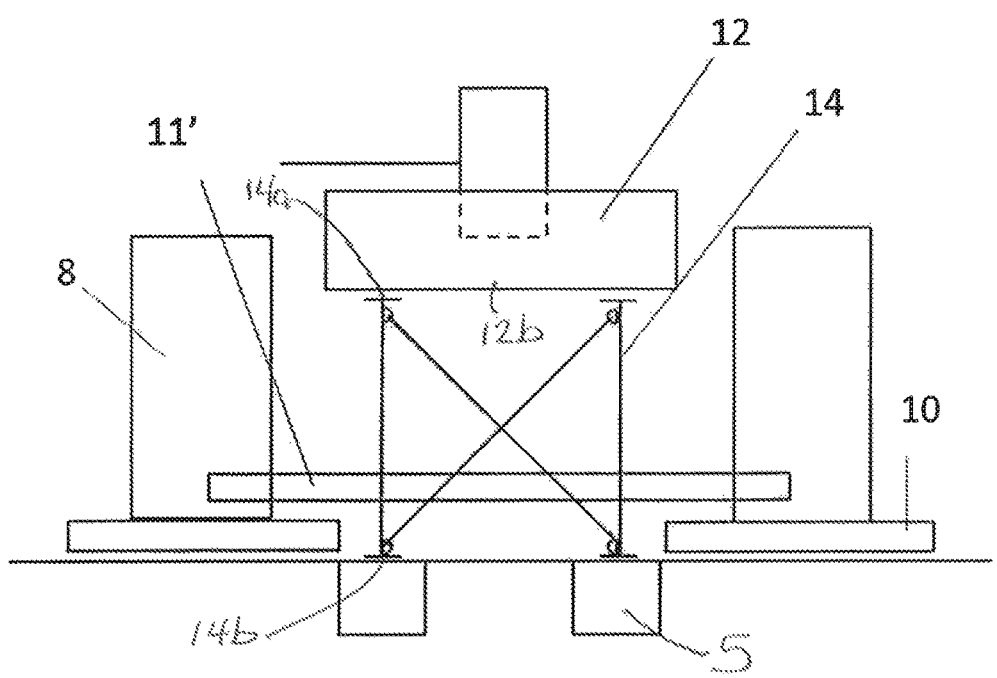

After the nacelle 4 has been lifted to an elevated position, as shown in FIG. 34B, the basic tower module 7 may be removed. A first upper tower module 14, having a top 14*a* and a bottom 14*b*, is placed between the nacelle 4 and the foundation 5. The top 14*a* of the first upper tower module 14 is then fastened to the bottom of the joint ring 12 of the nacelle 4 with the bottom 14*b* resting on the foundation 5. Upon the nacelle 4 being secured to the top 14*a* of the tower module 14, the lifting platforms 11 are lowered to be positioned toward the base of their respective lifting systems 8 as shown in FIG. 34C and the members 11' are moved outward from their second horizontal positions in preparation for being attached preferably to a lower portion of the first upper tower module.

Figure 34D:
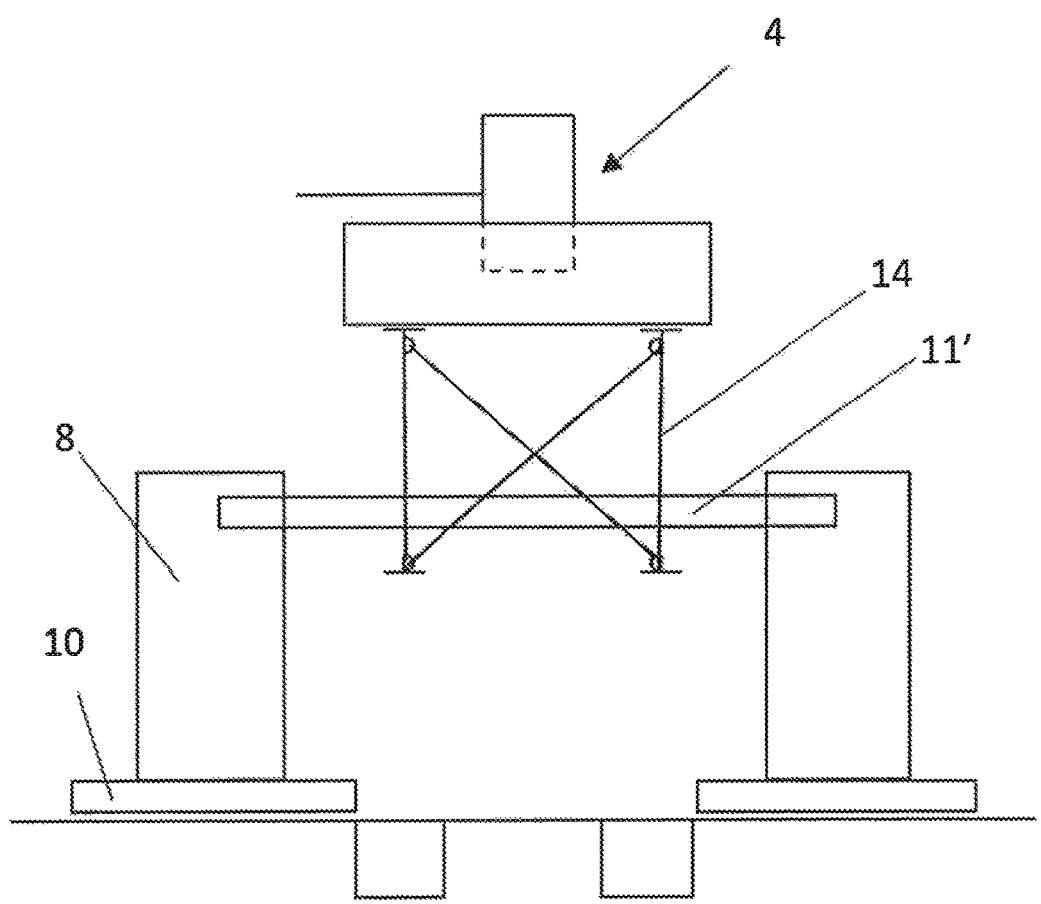
Figure 34E:
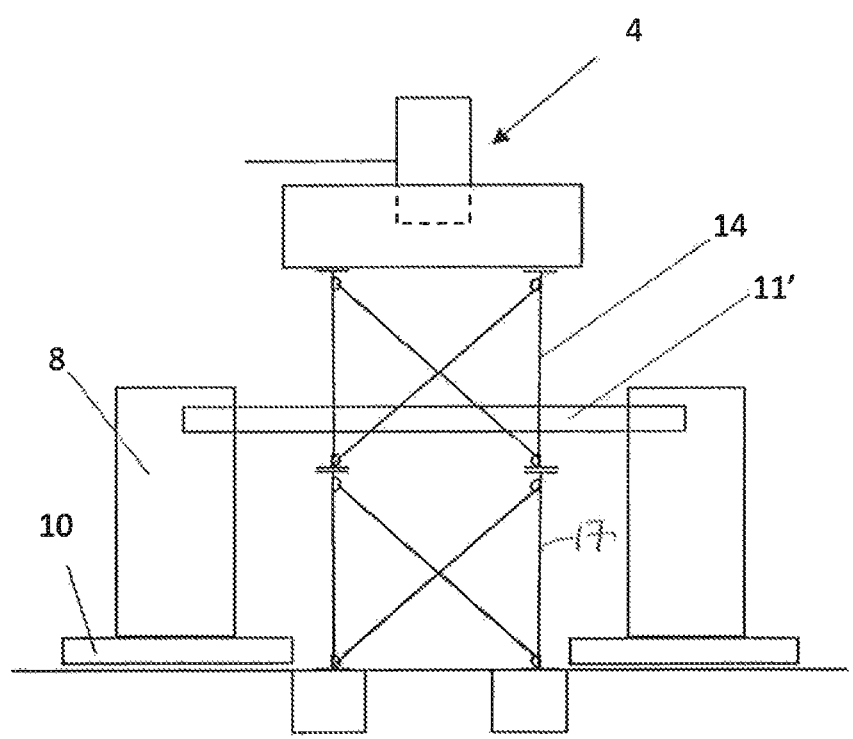

With the nacelle 4 securely attached to the top of the first upper tower module 14, the remainder of the tower may be constructed by the lifting and insertion of additional tower modules as shown in FIGS. 34D and 34E. With reference to FIG. 34C, this first involves moving the members 11' to their second horizontal positions and then securing them to the first tower module 14 at locations located between the top 14*a* and bottom 14*b* while the lifting platforms 11 are located toward the bottom of the lifting systems 8. According to one implementation the members 11' are secured to a lower portion of the legs 14*c* of the tower module 14 as shown in the figures. This maximizes the height by which the tower module may be lifted.

As shown in FIG. 35, one method of supporting each of the legs 14*c* of the tower module on members 11' is through the use of flanges 11'' attached to each of the legs, or otherwise integrated as a single unit with each of the legs. As shown in FIG. 35, when the members 11' are in their second horizontal positions they may be situated to reside adjacent the legs 14*c* with the bottom face of flange 11'' residing on an upper face of the members 11'. According to some implementations the flanges 11'' may be secured to the members 11' by the use of bolts, screws, clamps, etc.

Upon the first upper tower module 14 being supported on the members 11', the first upper tower module 14 and the nacelle 4 attached to it are elevated by moving the lifting platforms upward as shown in FIG. 34D. The first upper tower module 14 is lifted a distance that permits the insertion of a second upper tower module 17 below it as shown in FIG. 34E. With the second upper tower module 17 inserted below the first upper tower module 14, the first upper tower module 14 is slightly lowered so that the top of the second tower module 17 is positioned adjacent the bottom of the first upper tower module 14. The top of the second upper tower module 17 is then securely fixed to the bottom of the first upper tower module 14.

The process of inserting and attaching additional tower modules is repeated until the tower is completed. It is important to note that each time a tower module is placed onto the tower foundation, the bottom of the tower module may be securely attached to the foundation. If this is done, each time a tower module is to be lifted it must first be decoupled from the tower foundation.

It is important to note that although FIGS. 33 and 34B-E illustrate lattice-type tower modules, the disclosure is in no way limited to such structures. For example, the tower modules may comprise non-lattice type modules such as cylindrical modules, conical modules, etc. With respect to these other types of modules, their outer surfaces may be equipped with any of a variety of protuberances that are adapted to be coupled to or supported to the members 11'. These protuberances may be in the form of flanges, L-shaped members, inverted L-shaped members, etc.

The systems of FIGS. 33 and 34A-E may be modified in a manner such that the inwardly and outwardly moving members 11' may be coupled directly to the lifting systems 8 themselves without the use of a lifting platform 11. According to such an implementation the members 11' are also configured to moved upward and downward to assume the lifting and lowering functions previously performed by the lifting platforms 11.

According to some implementations systems for assembling a wind turbine are provided according to Clauses 1 through 12 below.

Clause 1. A system for assembling a wind turbine comprising a nacelle and a tower, the system comprising:
a tower foundation configured to support the wind turbine after the assembling,
a plurality of spaced-apart lifting systems disposed peripherally about the tower foundation, each lifting system having a lifting platform that moves vertically upward and downward by a first distance between upper and lower points, each lifting platform is capable of being coupled to the nacelle,
a basic tower module secured to the tower foundation, the basic tower module having a top and a bottom, the top being configured to support the nacelle, the basic tower having a first height,
a plurality of upper tower modules that are configured to be sequentially joined together to form the tower, the plurality of upper tower modules having a second height that is greater than the first height,
a plurality of auxiliary columns each having a top and a bottom, each of the plurality of auxiliary columns configured to be attached to a respective lifting platform so that when attached the auxiliary column extends vertically upward from the lifting platform to which it is attached, the height of each of the auxiliary columns being sufficient to permit a first of the plurality of upper tower modules to be inserted between the nacelle and the basic tower module or between a second of the plurality of upper tower modules and the basic tower module when the lifting platform is located at the upper point.
a plurality of first connectors that is each configured to anchor the top of at least some of the plurality of auxiliary columns to the nacelle: and a plurality of second connectors different than the plurality of first connectors that is each configured to anchor the top of at least some of the plurality of auxiliary columns to respective joints that join two adjoining upper tower modules.

Clause 2. The system according to clause 1, wherein the each lifting system is located on a base and is connected to adjacent lifting systems by a joint structure.

Clause 3. The system according to clause 1, wherein each lifting platform is configured to be directly anchored to the nacelle.

Clause 4. The system according to clause 1, wherein the top of each of the auxiliary columns comprises a flange, the first connector configured to connect the flange to the nacelle.

Clause 5. The system according to clause 1, wherein the top of each of the auxiliary columns comprises a flange, the second connector configured to connect the flange to the joint that joins two upper lattice tower modules.

Clause 6. The system according to clause 1, wherein the auxiliary columns are each configured to be removably attached to its respective lifting platform.

Clause 7. The system according to clause 4, wherein the first connector is configured to be removably attached to the flange.

Clause 8. The system according to clause 5, wherein the second connector is configured to be removably attached to the flange.

Clause 9. The system according to clause 7, wherein the flange is sandwiched by the first connector.

Clause 10. The system according to clause 8, wherein the flange is sandwiched by the second connector.

Clause 11. The system according to clause 1 wherein the basic tower module and the upper tower modules each comprise a lattice structure having three or more legs.

Clause 12. The system according to clause 11, wherein the number of lifting systems corresponds to the number of legs.

According to some implementations methods for assembling a wind turbine are provided according to Clauses 13 through 19 below.

Clause 13. A method for assembling a wind turbine comprising a nacelle and a tower, the method comprising:
preparing a foundation or a retractable platform for supporting a basic tower module,
installing the basic tower module so that it is supported on the foundation or the retractable platform,
mounting a plurality of lifting systems so that they are peripherally disposed about the basic tower module, each lifting system comprising a lifting platform, each lifting platform being vertically movable between a lower point and an upper point, each of the lifting systems being spaced-apart from one another,
coupling the nacelle to each of the lifting platforms,
vertically lifting the nacelle by use of the lifting systems,
inserting a first upper tower module between the nacelle and the basic tower module,
fastening the first upper tower module to the nacelle and to the basic tower module,
disconnecting the lifting platform of each of the lifting systems from the nacelle and lowering each of the lifting platforms,
installing an auxiliary column on each of the lifting platforms,
coupling a top portion of each of the auxiliary columns to the nacelle by use of a first connector,
disconnecting the first upper tower module from the basic tower module, raising the lifting platforms to lift the nacelle and also the first upper tower module that is fastened to the nacelle up and away from the basic tower module, inserting a second upper tower module between a bottom of the first upper tower module and to the top of the basic tower module, fastening the second upper tower module to the bottom of the first upper tower module and to the top of the basic tower module, disconnecting the nacelle from the auxiliary columns.

Clause 14. The method according to clause 13, further comprising:

lowering each of the lifting platforms, removing the first connectors from the auxiliary columns, attaching a second connector different from the first connector to each of the auxiliary columns, fastening each of the auxiliary columns by the use of the second connectors to a joint that joins the first and second upper tower modules, disconnecting the second upper tower module from the basic tower module; and raising the lifting platforms to lift the nacelle and also the first and second upper tower modules that are coupled to the nacelle up and away from the basic tower module.

Clause 15. The method according to clause 14 further comprising inserting a third upper tower module between a bottom of the second upper tower module and to the top of the basic tower module, fastening the third upper tower module to the bottom of the second upper tower module and to the top of the basic tower module.

Clause 16. The method according to clause 13, wherein the nacelle is coupled to the basic tower module before the mounting of the plurality of lifting systems peripherally about the basic tower module.

Clause 17. The method according to clause 13, wherein the nacelle is coupled to the basic tower module after the mounting of the plurality of lifting systems peripherally about the basic tower module.

Clause 18. The method according to clause 13, wherein the basic tower module has a first height and the first and second upper tower modules have a second height, the second height being greater than the first height.

Clause 19. The method according to clause 13, wherein the foundation is a retractable platform of an off-shore floating platform located at sea, the method further comprising retracting the platform and lowering at least a portion of the tower into the sea.

What is claimed is:

1. A system for assembling a wind turbine comprising a nacelle and a tower, the system comprising:

a tower foundation configured to support the wind turbine after the assembling, a plurality of spaced-apart lifting systems disposed about the periphery of the tower foundation, each lifting system having a lifting platform that moves vertically upward and downward between upper and lower points, a basic tower module having a top and a bottom, the bottom being configured to rest on the tower foundation, the top being configured to support the nacelle, the basic tower having a first height; and a plurality of upper tower modules that are configured to be sequentially joined together to form the tower, each of the plurality of upper tower modules including a plurality of flanges, at least a majority of the upper tower modules having a second height that is greater than the first height, a plurality of first connectors that is each configured to anchor the plurality of lifting platforms to the nacelle: and a plurality of second connectors different than the plurality of first connectors that is each configured to anchor the plurality of lifting platforms to the flanges of the upper tower modules.

2. The system according to claim 1, wherein the first and second connectors are configured to be removeably attached to the lifting platforms.

3. The system according to claim 1, wherein the second connectors comprise a first part and a second part are configured to be secured to opposite sides of the upper tower module flanges.

4. The system according to claim 1, wherein the upper tower modules each comprise a lattice structure having three or more legs and the number of lifting systems corresponds to the number of legs.

5. The system according to claim 1, wherein the plurality of lifting systems are disposed equidistantly about the tower foundation.

6. The system according to claim 1, wherein the each lifting system is located on a base and is connected to adjacent lifting systems by a joint structure.

7. The system according to claim 1, wherein the upper tower module is a cylindrical structure.

8. A system for assembling a wind turbine comprising a nacelle and a tower, the system comprising:

a tower foundation configured to support the wind turbine after the assembling, a plurality of spaced-apart lifting systems disposed around the tower foundation, each lifting system having a lifting platform that moves vertically upward and downward between upper and lower points, adjacent lifting platforms support and have disposed between them an elongate horizontal member that spans the distance between the adjacent lifting platforms and is configured to move horizontally inward and outward with respect to the lifting platforms between at least first and second horizontal positions, the second horizontal position being inward of the first horizontal position, when in the first horizontal position the elongate horizontal members are arranged capable of supporting a bottom of the nacelle; and an upper tower module having one or more protruding members that are capable of being supported on the elongate horizontal members when the elongate horizontal members are in the second horizontal position and not the first horizontal position.

9. The system according to claim 8, wherein the plurality of lifting systems are disposed equidistantly about the tower foundation.

10. The system according to claim 8 comprising a plurality of upper tower modules that are configured to be sequentially joined together to form the tower, each of the plurality of upper tower modules having one or more protruding members that are capable of being supported on the elongate horizontal members.

11. The system according to claim 8, wherein the each lifting system is located on a base and is connected to adjacent lifting systems by a joint structure.

12. The system according to claim 8, wherein the upper tower modules comprise a lattice structure having three or more legs.

13. The system according to claim 12, wherein the number of lifting systems corresponds to the number of legs.

14. The system according to claim 8, wherein the upper tower module is a cylindrical structure.

* * * * *